(12) United States Patent
Wakashiro et al.

(10) Patent No.: US 6,570,266 B1
(45) Date of Patent: May 27, 2003

(54) CONTROL APPARATUS FOR HYBRID VEHICLE

(75) Inventors: Teruo Wakashiro, Wako (JP); Shigetaka Kuroda, Wako (JP); Atsushi Matsubara, Wako (JP); Shinichi Kitajima, Wako (JP); Hideyuki Oki, Wako (JP); Hideyuki Takahashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 18 days.

(21) Appl. No.: 09/695,422

(22) Filed: Oct. 25, 2000

(30) Foreign Application Priority Data

Oct. 29, 1999 (JP) .......................................... 11-310347

(51) Int. Cl.$^7$ ............................................... H02P 9/04
(52) U.S. Cl. ..................... 290/40 C; 180/65.2; 180/65.3
(58) Field of Search ................................ 290/40 C, 17; 180/65.2, 65.3

(56) References Cited

U.S. PATENT DOCUMENTS

| | | | | |
|---|---|---|---|---|
| 4,200,832 A | * | 4/1980 | Johansson et al. ............. 290/14 |
| 4,305,254 A | * | 12/1981 | Kawakatsu et al. ......... 180/65.2 |
| 4,335,429 A | | 6/1982 | Kawakatsu .................. 701/102 |
| 4,407,132 A | * | 10/1983 | Kawakatsu et al. ......... 180/65.4 |
| 5,327,992 A | * | 7/1994 | Boll .......................... 180/65.2 |
| 5,469,816 A | * | 11/1995 | Murakawa et al. ............. 123/2 |
| 5,786,640 A | | 7/1998 | Sakai et al. .................... 290/17 |
| 5,806,617 A | * | 9/1998 | Yamaguchi ................. 180/65.2 |
| 5,875,864 A | * | 3/1999 | Yano et al. ............ 123/198 DB |
| 5,903,112 A | * | 5/1999 | Yamada et al. ............. 180/65.3 |
| 5,942,879 A | * | 8/1999 | Ibaraki ....................... 180/65.2 |
| 6,003,626 A | * | 12/1999 | Ibaraki et al. .............. 180/65.2 |
| 6,083,139 A | * | 7/2000 | Deguchi et al. ............ 180/65.2 |
| 6,138,784 A | * | 10/2000 | Oshima et al. ......... 123/568.11 |
| 6,209,672 B1 | * | 4/2001 | Severinsky ................. 180/65.2 |
| 6,216,465 B1 | * | 4/2001 | Wakashiro et al. ........ 180/65.2 |

FOREIGN PATENT DOCUMENTS

| | | | |
|---|---|---|---|
| EP | 0 800 947 A2 | 10/1997 | |
| EP | 0 808 735 A1 | 11/1997 | |
| EP | 0 904 971 A1 | 3/1999 | |
| EP | 1095811 A1 * | 5/2001 | ............ B60K/6/00 |
| JP | 401026333 A * | 1/1989 | |
| JP | 7-123509 | 5/1995 | |
| JP | 08322107 A * | 12/1996 | |
| JP | 02001082198 A * | 3/2001 | |

* cited by examiner

Primary Examiner—Joseph Waks
(74) Attorney, Agent, or Firm—Armstrong, Westerman & Hattori, LLP

(57) ABSTRACT

A control apparatus provided in a hybrid vehicle with a combustion engine for outputting a driving force, an electric motor for generating a force for assisting the output from the engine, depending on the driving conditions, a power storage unit for storing electric energy generated by the motor acting as a generator using the output from the engine and electric energy generated by the motor when the vehicle decelerates. The control apparatus includes an output assistance determining device for determining whether to assist the output from the engine by the motor; a generation controller for setting the amount of generation by the motor and performing the generation by the motor when the output assistance determining device determines that the motor is not to assist the output from the engine; and a generation limiter for limiting the amount of generation set by the generation controller.

7 Claims, 17 Drawing Sheets

CONTROL APPARATUS FOR HYBRID VEHICLE

This application is based on Japanese Patent Application No. 11-310347, the contents of which are incorporated herein by reference.

BACKGROUND OF THE INVENTION

1. Field of the Invention

The present invention related to a control apparatus for a hybrid vehicle having a combustion engine and an electric motor and in particular, to a control apparatus for a hybrid vehicle that adjusts the amount of energy charged by the motor, depending on a degree of throttle opening when the vehicle is cruising.

2. Description of the Related Art

Conventionally, hybrid vehicles which have electric motors as power sources for driving the vehicles in addition to engines are known.

In the conventional hybrid vehicles, there are parallel hybrid vehicles which use motors as assisting driving sources for assisting the output from the engines. Parallel hybrid vehicles assist the output from the engine by the motor when the vehicle accelerates, charge the battery by deceleration regeneration when the vehicle decelerates, and perform various controls, to respond the driver's demands while maintaining the remaining charge of the battery (as disclosed in Japanese Unexamined Patent Application, First Publication No. Hei 7-123509).

According to the control apparatus for the hybrid vehicle using the conventional technique, in a cruise mode in which the vehicle is traveling by the driving force produced by the engine without assistance by the motor, when a target energy amount to be charged in the battery is high so that the control for using the motor as a generator is preferred, the frequency of assisting the output from the engine by the motor decreases, and the driver may therefore depress the accelerator pedal.

Particularly, in the cruise mode on a sloping road, when the control for using the motor as a generator is preferred, the driveability may be degraded, contrary to the driver's expectation, and this may increase the frequency of depressing the accelerator pedal.

Thus, there is the problem that the driveability is degraded while the fuel consumption may be increased because the frequency of stopping the fuel supply is decreased.

SUMMARY OF THE INVENTION

It is therefore an object of the present invention to provide a control apparatus for a hybrid vehicle which adjusts the amount of energy charged by the motor, depending on the degree (extent, or state) of throttle opening, to control the driving conditions of the vehicle according to the driver's expectations, thereby reducing the fuel consumption.

In a first aspect of the present invention, the control apparatus is provided in a hybrid vehicle with a combustion engine (E) for outputting a driving force, an electric motor (M) for generating a force for assisting the output from the engine, depending on a driving condition, a power storage unit (22) for storing electric energy generated by the motor acting as a generator using the output from the engine and electric energy regenerated by the motor when the vehicle decelerates. The control apparatus comprises: an output assistance determining device (S122, S135) for determining whether to assist the output from the engine by the motor; a generation controller (11) for setting the amount of generation (CRSRGN) by the motor and performing the generation by the motor when the output assistance determining device determines that the motor is not to assist the output from the engine; and a generation limiter (S362) for limiting the amount of generation set by the generation controller.

According to the control system for the hybrid vehicle even when the control for using the motor as a generator is preferred, the generation amount limiter limits the amount of generation, thereby providing the driving conditions responsive to the driver, and decreases the frequency of depressing the accelerator pedal, thereby reducing the fuel consumption.

In a second aspect of the present invention, the generation limiter limits the generation, depending on the degree of throttle opening (THEM).

According to the second aspect of the present invention, when the degree of the throttle opening is greater than a predetermined value, it is determined that the driver wishes to maintain or improve the driveability of the vehicle, and the amount of generation by the motor is limited, depending on the degree of the throttle opening. Thus, the motor assists the output from the engine only when the assistance is required, while decreasing the frequency of depressing the accelerator pedal, thereby reducing the fuel consumption.

In a third aspect of the present invention, the control apparatus for a hybrid vehicle further comprises a generation amount corrector (S351, S353) for correcting the amount of generation set by the generation controller, depending on the driving conditions of the vehicle. The generation limiter limits the corrected value of the amount of generation.

According to the third aspect of the present invention, the amount of generation is corrected, based on the remaining battery charge, the operation of the air conditioner, and the electric current consumed by various electrical devices.

In a fourth aspect of the present invention, the control apparatus for a hybrid vehicle comprises: a mode determining device for determining at least one of an acceleration mode, a cruise mode, and a deceleration mode, depending on the driving condition of the vehicle; a generation controller (11) for directing the motor to generate electric energy without the assistance of the output from the engine when the mode determining device determines that the vehicle is in the cruise mode; and a generation limiter (S362) for limiting the amount of generation, depending on the driving condition of the vehicle. The motor generates the electric energy, based on the amount of generation limited by the generation limiter.

When the vehicle is in the cruise mode in which the assistance of the output from the engine is not required, and when the load on the engine is high, e.g., when the vehicle is cruising on an uphill road, the load on the engine arising from the generation is decreased. Therefore, the degradation of the driveability of the vehicle is prevented, and the frequency of depressing the accelerator pedal can be decreased, thereby reducing the fuel consumption.

The control apparatus for a hybrid vehicle further comprises a remaining battery charge measuring device (13) for measuring the remaining battery charge. When the remaining battery charge is below a predetermined value, the generation limiter does not limit the amount of generation.

DETAILED DESCRIPTION OF THE INVENTION

Figure 1:
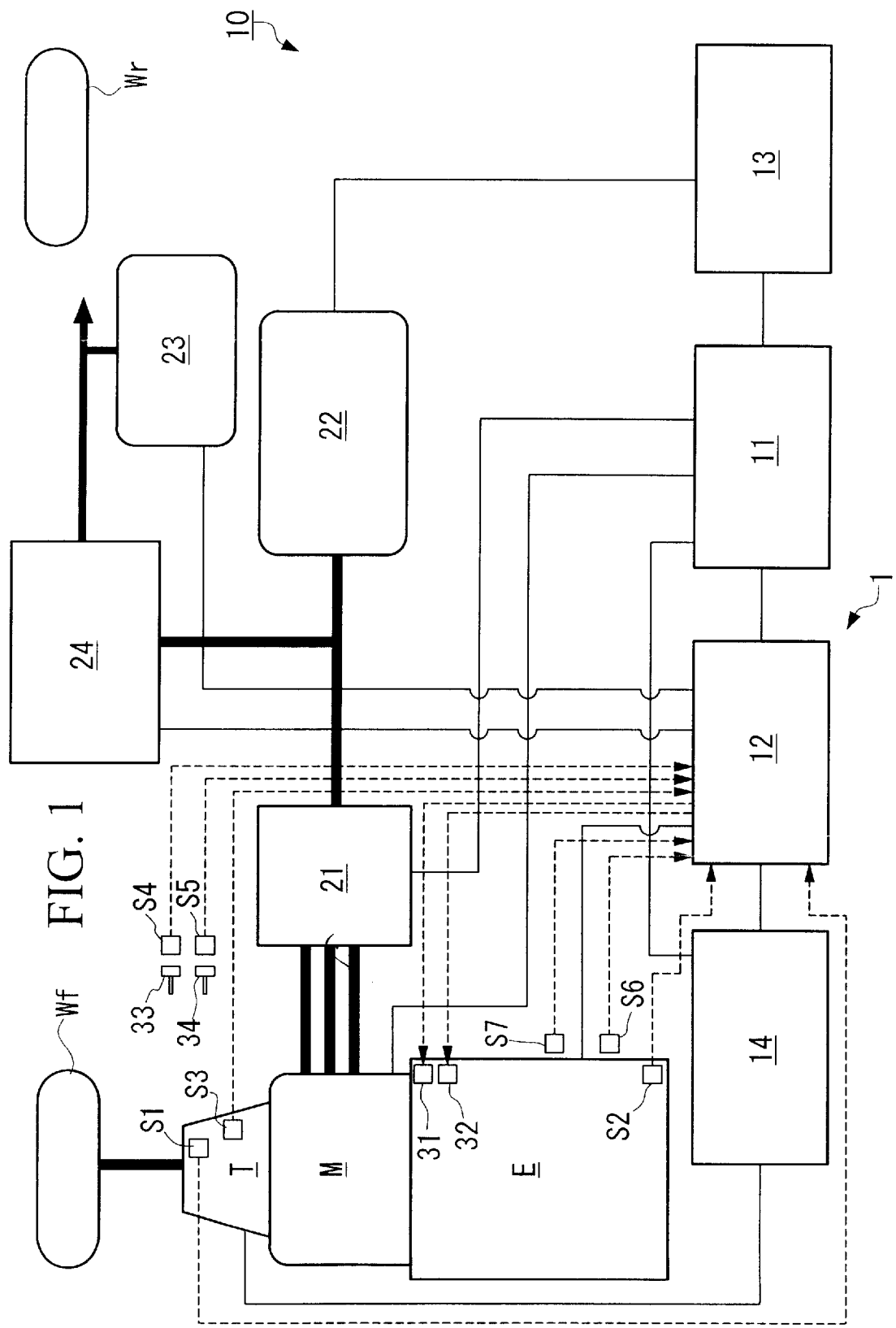
FIG. 1 is a diagram showing the structure of the hybrid vehicle with the control system of the present invention.

The embodiment of the control apparatus for the hybrid vehicle of the present invention will be explained with reference to the figures. FIG. 1 is a diagram showing the structure of the hybrid vehicle 10 having the control apparatus 1 of the present invention.

The hybrid vehicle 10 is a parallel hybrid vehicle. Driving forces from both an engine E and a motor M are transmitted via a transmission T of an automatic or manual transmission, to front wheels Wf which are the drive wheels. When the hybrid vehicle 10 decelerates and the driving force is transmitted from the front wheels Wf to the motor M, the motor M acts as a generator to generate what is termed a regenerative braking force, so that the kinetic energy of the vehicle body is stored as electric energy.

The control apparatus 1 for the hybrid vehicle of the present invention comprises a motor ECU 11, an FIECU 12, a battery ECU 13, and a CVTECU 14.

A power drive unit 21 performs the driving and regeneration of the motor M in response to control commands from a motor ECU 11. A high-voltage battery 22 for sending and receiving electric energy to and from the motor M is connected to the power drive unit 21. The battery 22 includes a number of, e.g., ten modules connected in series, each module having a number of, e.g., twenty cells connected in series. The hybrid vehicle 10 includes a 12-volt auxiliary battery 23 for driving various accessories. The auxiliary battery 23 is connected to the battery 22 via a downverter 24. The downverter 24, controlled by an FIECU 12, reduces the voltage from the battery 22 and charges the auxiliary battery 23.

The FIECU 12 controls, in addition to the motor ECU 11 and the downverter 24, the fuel supply amount controller 31 for controlling the amount of fuel supplied to the engine E, the starter motor 32, the ignition timing, etc. Therefore, the FIECU 12 receives a signal from a speed sensor $S_1$ for detecting the vehicle speed V based on the rotation of the driving shaft of the transmission T, a signal from the engine rotational speed sensor $S_2$ for detecting the engine rotational speed NE, a signal from the shift position sensor $S_3$ for detecting the shift position of the transmission T, a signal from the brake switch $S_4$ for detecting operation of a brake pedal 33, a signal from the clutch switch $S_5$ for detecting operation of a clutch pedal 34, a signal from the throttle valve opening sensor $S_6$ for detecting the throttle opening state TH, and a signal from the air intake passage pressure sensor $S_7$ for detecting the air intake passage pressure PB.

The battery ECU 13 protects the battery 22, and calculates the state of charge (remaining charge) SOC of the battery 22. The CVTECU 14 controls the CVT.

The operation of the control apparatus 1 for the hybrid vehicle with the above-described structure will be explained with reference to the figures.

Motor Operation Mode Determination

The control modes of the hybrid vehicle 10 are "idling stop mode", "idling mode", "deceleration mode", "acceleration mode", and "cruise mode."

Figure 2:
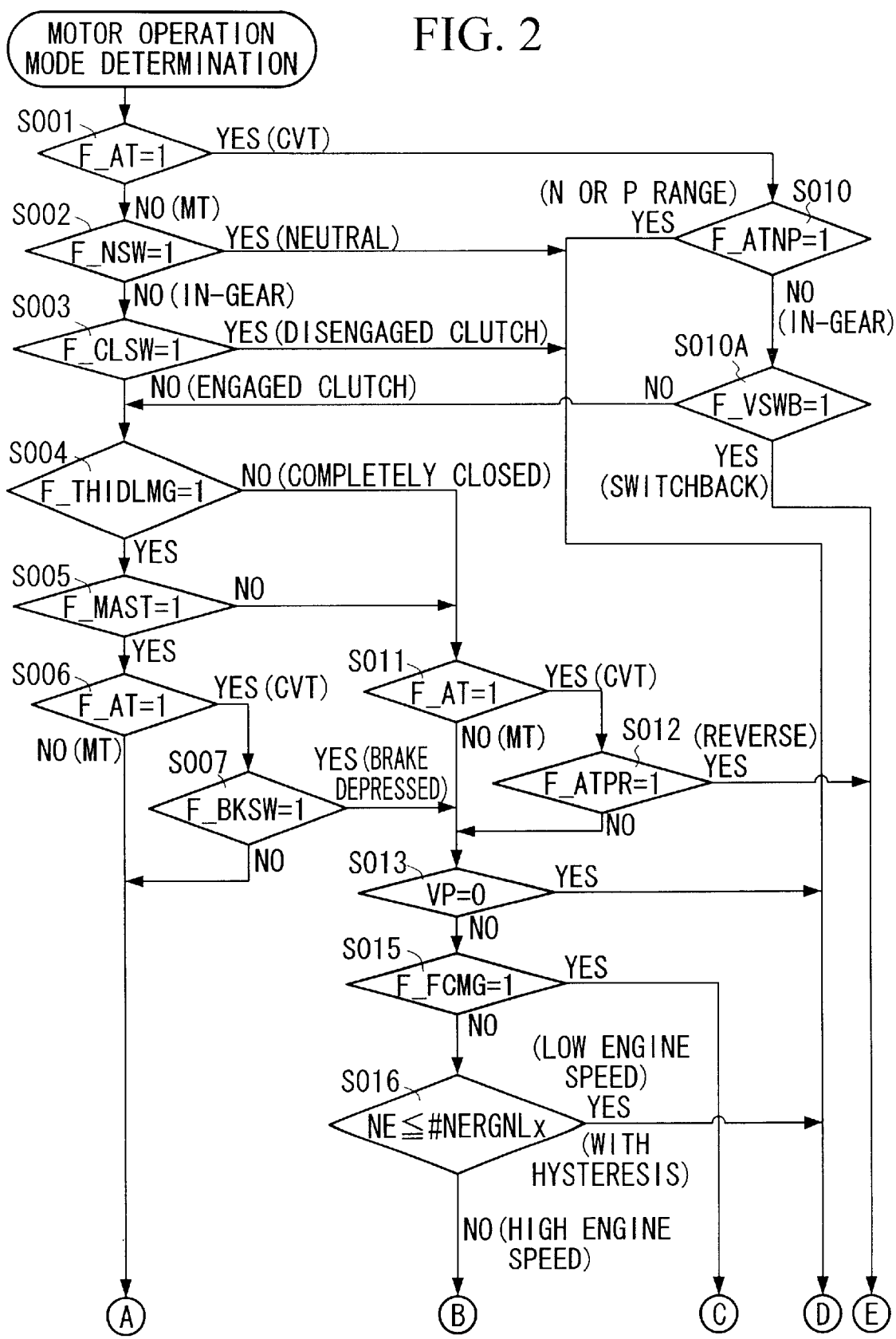
FIG. 2 is a flowchart showing the motor operation determination in the present invention.
Figure 3:
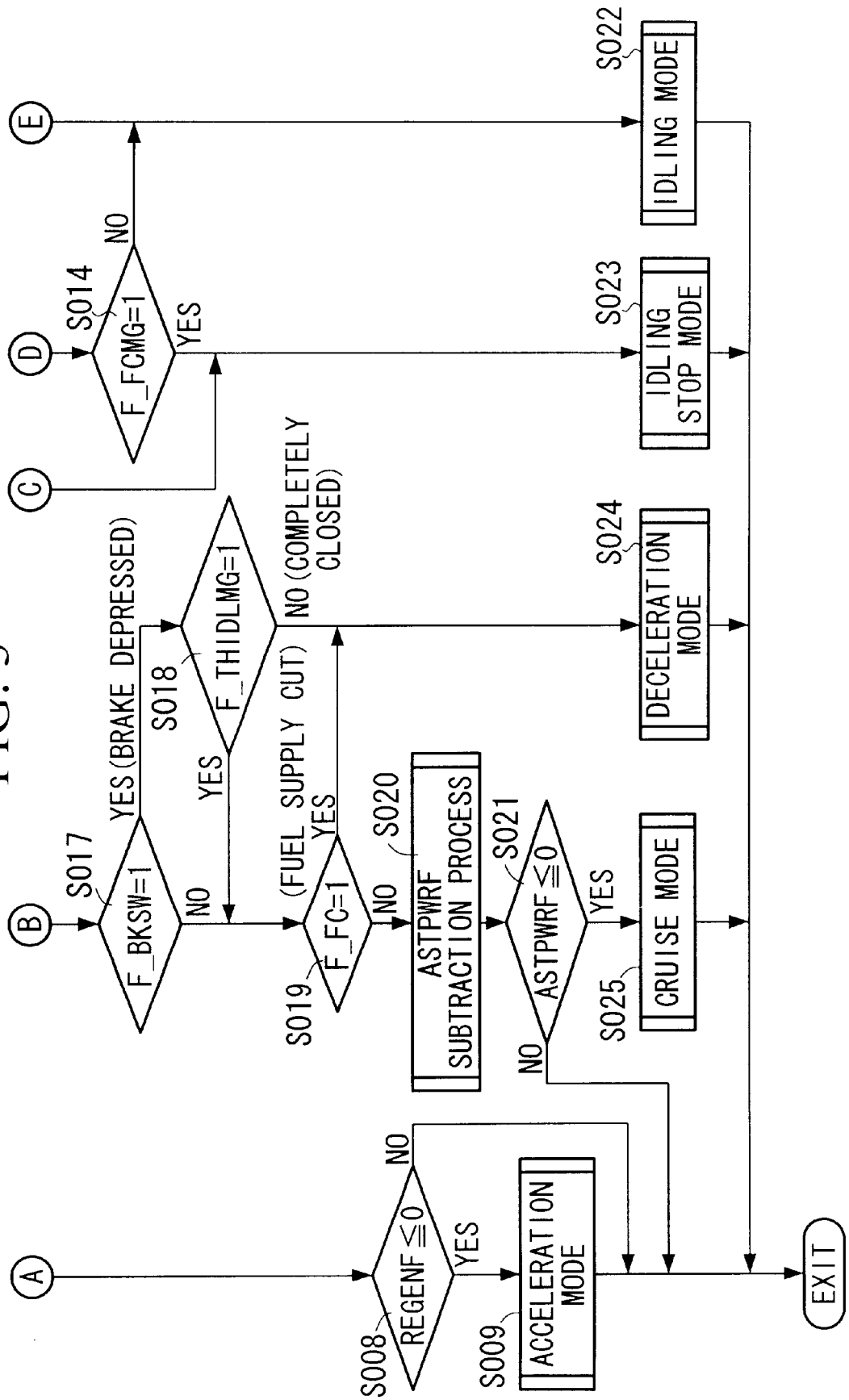
FIG. 3 is a flowchart showing the motor operation determination in the present invention.

Referring to the flowchart of FIGS. 2 and 3, the process for determining the motor operation mode will be explained. FIGS. 2 and 3 are the flowcharts showing the motor operation mode determination.

In step S001, it is determined whether a MT/CVT determination flag F_AT is 1. When this determination is NO, that is, when the vehicle is an MT vehicle, the flow proceeds to step S002. When in step S001 the determination is YES, that is, when the vehicle is a CVT vehicle, the flow proceeds to step S010, and it is then determined whether the CVT in-gear determination flag F_ATNP is 1. When in step S010 the determination is NO, that is, when in the in-gear state, the flow proceeds to step S010A, and it is then determined, based on a switch back determination flag F_VSWB, whether the vehicle is being switched back (the shift lever is being operated). When the vehicle is being switched back, the flow proceeds to step S022, enters the idling mode, and the control terminates. In the idling mode, the supply of the fuel supply is stopped, and is then restarted, and the idling of the engine E is continued.

In the idling mode, as the 12-volt current consumption is increased, and electric power is supplied from the battery 22 to compensate for the increase in consumption.

As the result of the determination in step S010A, when the vehicle is not being switched back, the flow proceeds to step S004.

When in step S010 the determination is YES, that is, when in the N-(neutral) or P-(parking) position, the flow proceeds to step S014, and it is determined whether the engine stop control execution flag F_FCMG is 1. When in step S014 this determination is NO, the flow enters idling mode in step S022, and the control terminates. When in step S014 the flag is 1, the flow proceeds to step S023, and enters idling stop mode, and the control terminates. In the idling stop mode, the engine E is stopped under specified conditions e.g., when the hybrid vehicle 10 is stopped.

In step S002, it is determined whether the neutral position determination flag F_NSW is 1. When in step S002 the determination is YES, that is, when in the neutral position, the flow proceeds to step S014. When in step S002 the determination is NO, that is, when in the in-gear state, the flow proceeds to step S003, and it is determined whether a clutch engagement determination flag F_CLSW is 1. When the determination is YES, that is, when the clutch is disengaged, the flow proceeds to step S014. When in step S003 the determination is NO, that is, when the clutch is engaged, the flow proceeds to step S004.

In step S004, it is determined whether the IDLE determination flag F_THIDLMG is 1. When this determination is NO, that is, when the throttle is completely closed, the flow proceeds to step S011. When in step S004 the determination is YES, that is, when the throttle is not completely closed, the flow proceeds to step S005, and it is determined whether the motor assistance determination flag F_MAST related to the determination of whether to assist the output from the engine E by the motor M (hereinafter referred to as "motor assistance") is 1. When in step S005 the determination is NO, the flow proceeds to step S011. When in step S005 the determination is YES, the flow proceeds to step S006.

In step S011, it is determined whether the MT/CVT determination flag F_AT is 1. When the determination is NO, that is, when the vehicle is an MT vehicle, the flow proceeds to step S013. When in step S011 the determination is YES, that is, when the vehicle is a CVT vehicle, the flow proceeds to step S012, and it is determined whether the reverse position determination flag F_ATPR is 1. When this determination is YES, that is, when in the reverse position, the flow proceeds to step S022. When the determination is NO, that is, when in other than the reverse position, the flow proceeds to step S013.

In step S006, it is determined whether the MT/CVT determination flag F_AT is 1. When this determination is NO, that is, when the vehicle is an MT vehicle, it is determined in step S008 whether a final charging command value REGENF is equal to or below zero. When the value is equal to or below zero, the flow proceeds to the acceleration mode in step S009, and the control terminates. When in step S008 the REGENF is above zero, the control terminates. In the acceleration mode, as the consumption of the 12-volt current is increased, a part of the electric power to be used to assist the engine E is drawn from the battery 22, and is consumed as the 12-volt current.

When in step S006 the determination is YES, that is, the vehicle is a CVT vehicle, the flow proceeds to step S007, and it is determined whether a brake ON determination flag F_BKSW is 1. When this determination is YES, that is, when the driver is depressing the brake, the flow proceeds to step S013. When in step S007 the determination is NO, that is, when the driver is not depressing the brake, the flow proceeds to step S008.

In step S013, it is determined whether the vehicle speed VP for controlling the engine is zero. When this determination is YES, that is, when the vehicle speed VP for controlling the engine is zero, the flow proceeds to step S014. When in step S013 the determination is NO, that is, when the vehicle speed VP for controlling the engine is not zero, the flow proceeds to step S015. In step S015, it is determined whether an engine stop control execution flag F_FCMG is 1. When in step S015 the determination is NO, the flow proceeds to step S016. When instep S015 the flag is 1, the flow proceeds to step S023.

In step S016, an engine speed NE is compared with a cruise/deceleration mode lower limit engine speed #NERGNLx. The character "x" in the cruise/deceleration mode lower limit engine speed #NERGNLx indicates a value set for each gear (which includes hysteresis).

As the result of the comparison in step S016, when the engine speed NE$\leq$ the cruise/deceleration mode lower limit engine speed #NERGNLx, that is, when the engine speed is low, the flow proceeds to step S014. When in step S016 NE>#NERGNLx, that is, when the engine speed is high, the flow proceeds to step S017.

In step S017, it is determined whether the brake ON determination flag F_BKSW is 1. When in step S017 the determination is YES, that is, the driver is depressing the brake, the flow proceeds to step S018. When in step S017 the determination is NO, that is, the driver is not depressing the brake, the flow proceeds to step S019.

In step S018, it is determined whether the IDLE determination flag F_THIDLMG is 1. When this determination is NO, that is, when the throttle is completely closed, the flow proceeds to step S024, and enters the deceleration mode, and the control terminates. In the deceleration mode, the regenerative braking by the motor M is performed. When in step S018 the determination is YES, that is, when the throttle is not completely closed, the flow proceeds to step S019. In the deceleration mode, as the consumption of the 12-volt current is increased, a part of the regenerated electric power to be supplied to the battery 22 is assigned to the consumption by the 12-volt system.

In step S019, it is determined whether a fuel supply cut execution flag F_FC is 1. When this determination is YES, that is, when the fuel supply is stopped, the flow proceeds to step S024. When in step S019 the determination is NO, the flow proceeds to step S020, a final assistance command value ASTPWRF is decreased, and in step S021 it is determined whether the final assistance command value ASTPWRF is equal to or below zero. When the value is equal to or below zero, the flow proceeds to step S025, and enters the cruise mode. In the cruise mode, the hybrid vehicle 10 travels by the driving force produced by the engine E without assistance by the motor M. When in step S021 the ASTPWRF is above zero, the control terminates.

Zoning of State of Charge (SOC)

The zoning of the state of charge (also referred to as the "remaining charge" or SOC) (dividing the remaining charge into zones), which significantly affects the entry into the various control modes, will be explained. The calculation of the SOC is carried out by the battery ECU 13 of the hybrid vehicle 10, based on, i.e., the voltage, the discharged current, or the temperature.

In this example, zone A (from 40% to 80 or 90% of SOC), which is the normal use zone, is defined as the standard. Zone B (from 20% to 40% of SOC), which is a temporary use zone, is below zone A, and zone C (from 0% to 20% of SOC), which is an over-discharge zone, is below zone B. Zone D (from 80% or 90% to 100% of SOC), which is an overcharge zone, is above zone A. The SOC is calculated by integrating the discharged current when in zones A and B, and is calculated based on voltages when in zones C and D, taking into consideration the characteristics of the battery.

The boundaries between zones A, B, C, and D have upper and lower threshold values. The threshold values when the SOC is increasing are chosen to differ from those when the SOC is decreasing so as to cause hysteresis.

Assist Trigger Determination

Figure 4:
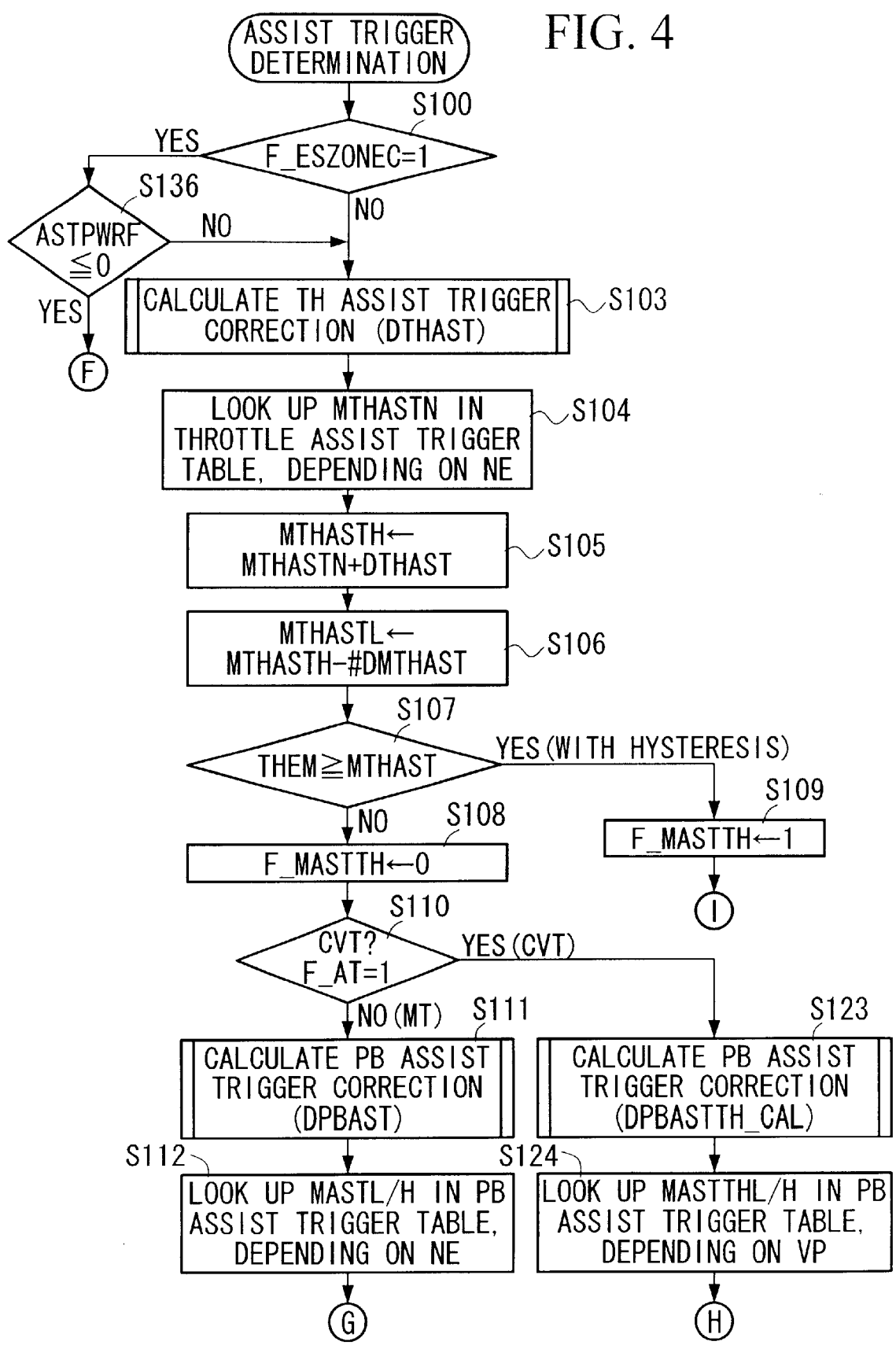
FIG. 4 is a flowchart showing the assist trigger determination in the present invention.
Figure 5:
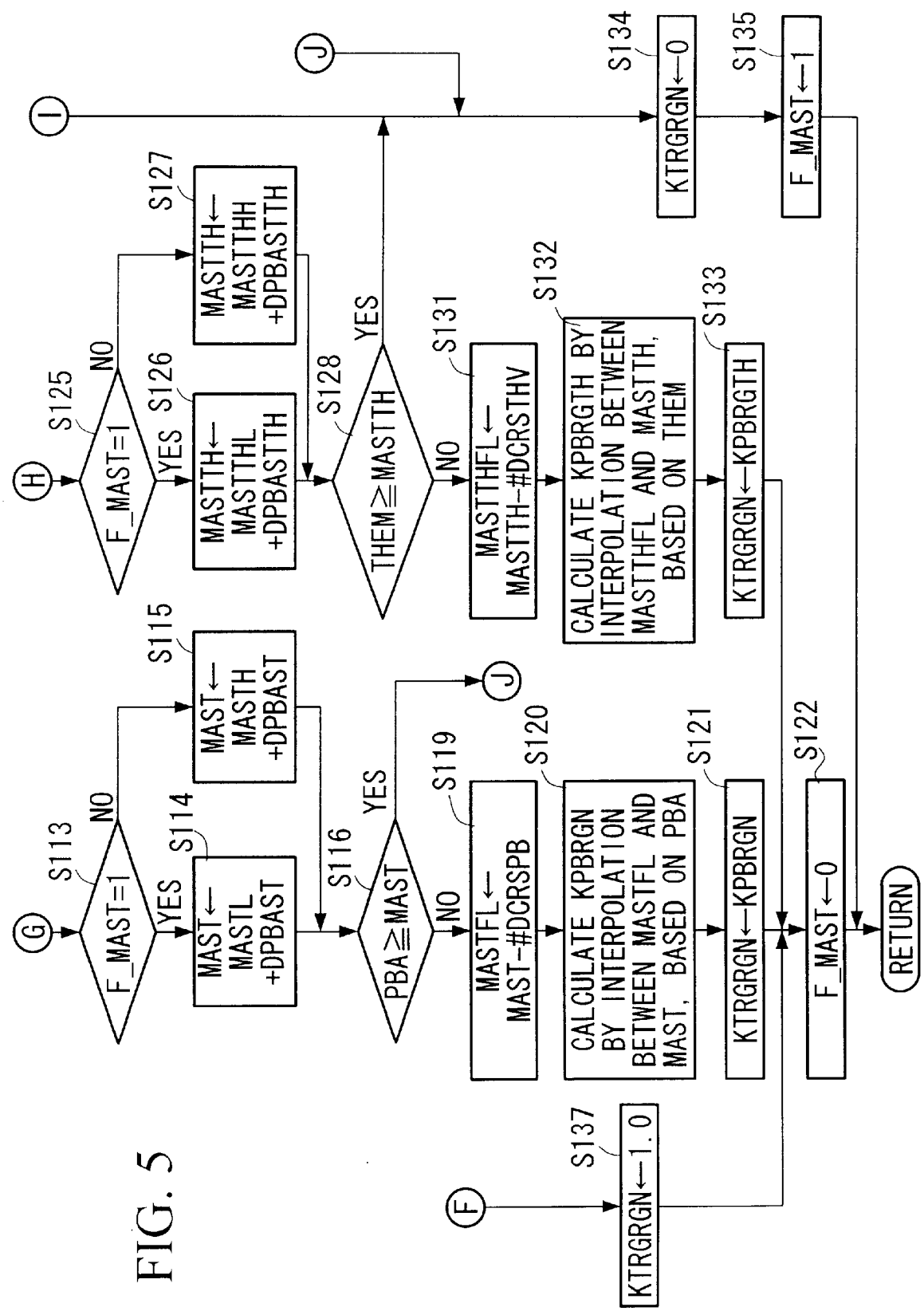
FIG. 5 is a flowchart showing the assist trigger determination in the present invention.
Figure 6:
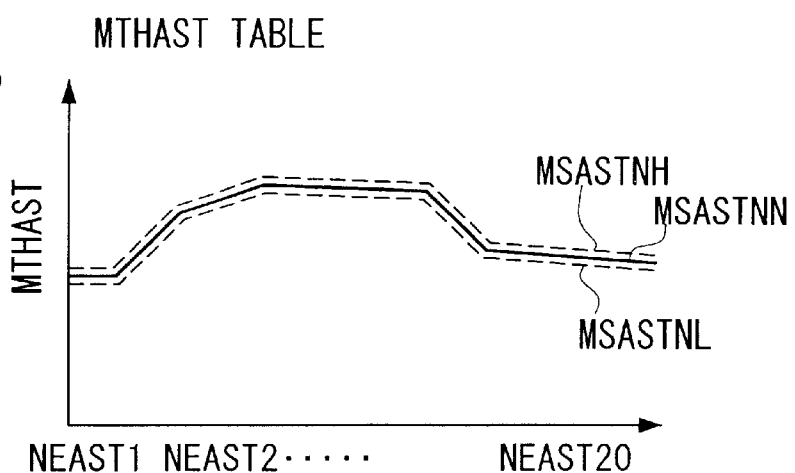
FIG. 6 is a graph showing threshold values in a TH assist mode and in a PB assist mode in the present invention.
Figure 7:
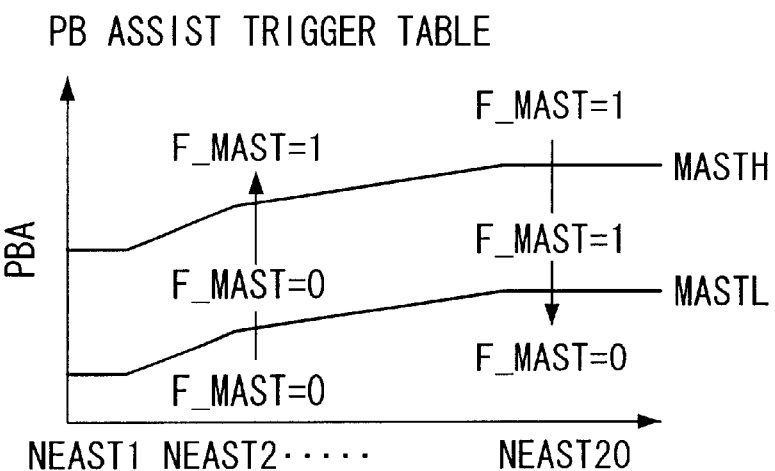
FIG. 7 is a graph showing threshold values for an MT vehicle in the PB assist mode in the present invention.
Figure 8:
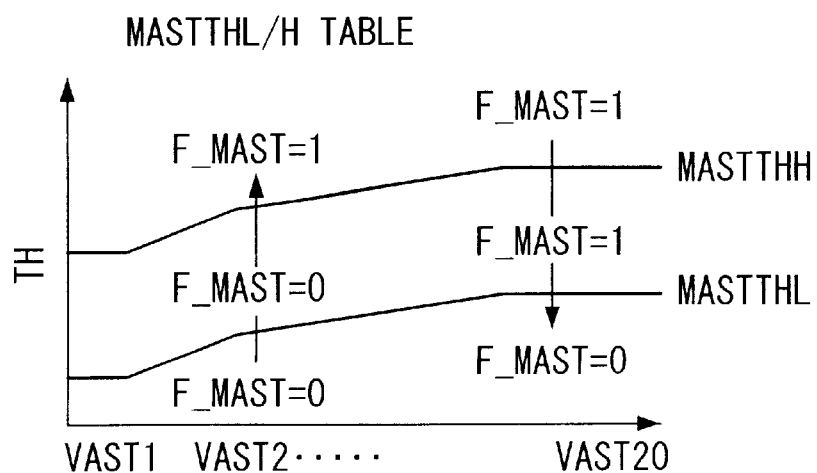
FIG. 8 is a graph showing threshold values for a CVT vehicle in the PB assist mode in the present invention.

Next, the assist trigger determination, which specifically determines the assist/cruise mode based on zones, will be explained with reference to FIGS. 4 to 8. FIGS. 4 and 5 are flowcharts showing the assist trigger determination. FIG. 6 is a graph showing threshold values in a TH assist mode and in a PB assist mode. FIG. 7 is a graph showing a threshold value in a PB assist mode for an MT vehicle. FIG. 8 is a graph showing a threshold value in a PB assist mode for a CVT vehicle.

In step S100 in FIG. 4, it is determined whether an energy storage zone C flag F_ESZONEC is 1. When this determination is YES, that is, when the battery remaining charge SOC is in zone C, it is determined in step S136 whether a final assist command value ASTPWRF is equal to or below 0. When in step S136 the determination is YES, that is, when the final assist command value ASTPWRF is equal to or below 0, a cruise generation subtraction coefficient KTRGRGN is set to 1.0 in step S137, a motor assist determination flag F_MAST is set to 0 in step S122, and the flow returns.

When in steps S100 and S136 the determination is NO, a throttle assist trigger correction value DTHAST is calculated in step S103. This process will be described below.

In step S104, a threshold value MTHASTN which is the standard for the throttle assist trigger is looked up in a throttle assist trigger table. The throttle assist trigger table, as shown with the solid line MSASTNN in FIG. 6, defines the threshold value MTHASTN of the degree of throttle opening depending on the engine speed NE. The threshold value MTHASTN is the standard for the determination of whether the motor assist is performed. For example, twelve threshold values MTHASTN are defined, based on the values NEAST1 to NEAST20 of the engine speed NE.

Subsequently, in steps S105 and S106, the threshold value MTHASTN which is the standard for the throttle assist trigger obtained in step S104 is added to the correction value DTHAST calculated in step S103 to obtain an upper throttle assist trigger threshold MTHASTH. A difference #DMTHAST for setting the hysteresis is subtracted from the upper throttle assist trigger threshold value MTHASTH to obtain a lower throttle assist trigger threshold value MTHASTL. These upper and lower throttle assist trigger threshold values are shown with the dashed lines MSASTNH and MSASTNL in FIG. 6, overlapping the standard threshold value MTHASTN of the throttle assist trigger table.

In step S107, it is determined whether the present value THEM of the opening state (extent, or degree) TH of the throttle is equal to or above the throttle assist trigger threshold value MTHAST calculated in steps S105 and S106. The throttle assist trigger threshold value MTHAST, which includes the hysteresis mentioned above, refers to the upper throttle assist trigger threshold value MTHASTH when the degree TH of the throttle opening is increased, and refers to the lower throttle assist trigger threshold value MTHASTL when the degree TH of the throttle opening is decreased.

When in step S107 the determination is YES, that is, when the present value THEM of the degree TH of throttle opening is equal to or above the throttle assist trigger threshold value MTHAST (which has the upper and lower hysteresis), the flow proceeds to step S109. When in step S107 the determination is NO, that is, when the present value THEM of the degree TH of throttle opening is not equal to or above the throttle assist trigger threshold value MTHAST (which has the upper and lower hysteresis), the flow proceeds to step S108.

In step S109, the throttle motor assist determination flag F_MASTTH is set to 1. In step S108, the throttle motor assist determination flag F_MASTTH is set to 0.

In the above process, it is determined whether the motor assist is required according to the degree TH of the throttle opening. When in step S107 the present value THEM of the degree TH of the throttle opening is equal to or above the throttle assist trigger threshold value MTHAST, the throttle motor assist determination flag F_MASTTH is set to 1. In the above-described acceleration mode, the flag is read and it is determined that the motor assist is required.

When in step S108 the throttle motor assist determination flag F_MASTTH is set to 0, this indicates that the vehicle is outside the zone in which the motor assist determination is made based on the degree TH of throttle opening. The embodiment performs the assist trigger determination based on the throttle opening state TH or on the air intake passage pressure PB of the engine. When the present value THEM of the degree TH of the throttle opening is equal to or above the throttle assist trigger threshold value MTHAST, the assist determination is made based on the opening state TH of the throttle, while, when the present value THEM does not exceed the threshold value MTHAST, the determination is made based on the air intake passage pressure PB.

In step S109, the throttle motor assist determination flag F_MASTTH is set to 1. Then, the flow proceeds to step S134, and the cruise generation subtraction coefficient KTRGRGN is set to 0. In the next step S135, the motor assist determination flag F_MAST is set to 1, and the flow returns.

In step S110, it is determined whether a MT/CVT determination flag F_AT is 1. When this determination is NO, that is, when the vehicle is an MT vehicle, the flow proceeds to step S111. When in step S110 the determination is YES, that is, when the vehicle is a CVT vehicle, the flow proceeds to step S123. In step S111, an air intake passage assist trigger correction value DPBAST is calculated. The details of this process will be explained below.

Subsequently, in step S112, threshold values MASTL and MASTH for the air intake passage pressure assist trigger are looked up in an air intake passage pressure assist trigger table. The air intake passage pressure assist trigger table, as shown with the two solid lines in FIG. 7, defines the upper air intake passage pressure assist trigger threshold value MASTH and the lower air intake passage pressure assist trigger threshold value MASTL for determining whether the motor assist is required depending on the engine rotational speed NE. In the process in step S112, when the air intake passage pressure PBA, as the PBA is increased or as the engine rotational speed NE is decreased, crosses the upper threshold value line MASTH from the lower area to the upper area in FIG. 7, the motor assist determination flag F_MAST is switched from 0 to 1. When the air intake passage pressure PBA, as the PBA is decreased or as the engine rotational speed NE is increased, crosses the lower threshold value line MASTL from the upper area to the lower area, the motor assist determination flag F_MAST is switched from 1 to 0. The process shown in FIG. 7 is changed depending on the stoichiometric or the lean-burn state.

In the next step S113, it is determined whether the motor assist determination flag F_MAST is 1. When this determination is 1, the flow proceeds to step S114. When the determination is not 1, the flow proceeds to step S115.

In step S114, the air intake passage pressure lower threshold value MASTL calculated in step S112 and the correction value DPBAST calculated in step S111 are added to thereby obtain an air intake passage assist trigger threshold value MAST. In step S116, it is determined whether the present air intake passage pressure PBA is equal to or above the MAST obtained in step S114. When this determination is YES, the flow proceeds to step S134. When the determination is NO, the flow proceeds to step S119.

In step S115, the air intake passage assist trigger upper threshold value MASTH looked up in step S112 and the correction value DPBAST calculated in step S111 are added to thereby obtain the air intake assist trigger threshold value MAST, and the flow proceeds to step S116.

In step S119, a predetermined air intake passage pressure delta value #DCRSPB (e.g., 100 mmHg) is subtracted from the air intake passage pressure assist trigger threshold value MAST, to thereby obtain a final air intake passage pressure lower threshold value MASTFL. Then, in step S120, the threshold value is interpolated between MASTFL and MAST, based on the present air intake passage pressure PBA, to thereby obtain a cruise generation subtraction coefficient KPBRGN. In step S121, this KPBRGN is set as the cruise generation subtraction coefficient KTRGRGN. In step S122, the motor assist determination flag F_MAST is set to 0, and the flow returns.

When in step S110 the determination of the MT/CVT determination flag F_AT is YES, that is, when the vehicle is a CVT vehicle, the flow proceeds to step S123, and the air intake passage pressure assist trigger correction value DPBASTTH is calculated. The details of this process will be explained later.

In step S124, the PB assist trigger threshold values MASTTHL and MASTTHH are looked up in the PB assist trigger table. The PB assist trigger table, as shown in FIG. 8 with two solid lines, defines the upper PB assist trigger threshold value MASTTHH and the lower PB assist trigger threshold value MASTTHL for determining whether to perform the assist by the motor, depending on the vehicle speed VP. In the look-up process in step S124, when the degree TH of throttle opening, as it is increased or as the vehicle speed VP is decreased, crosses the upper threshold value line MASTTHH from the lower area to the upper area in FIG. 8, the motor assist determination flag F_MAST is switched from 0 to 1. When TH, as it is decreased or as VP is increased, crosses the lower threshold value line MASTTHL from the upper area to the lower area, the motor assist determination flag F_MAST is switched from 1 to 0. The process shown in FIG. 8 is changed depending on the position of the gear, and depending on the stoichiometric or the lean-burn state.

In step S125, it is determined whether the motor assist determination F_MAST is 1. When the flag is 1, the flow proceeds to step S126. When it is not 1, the flow proceeds to step S127.

In step S126, the lower PB assist trigger threshold value MASTTL looked up in step S124 is added to the correction value DPBASTTH calculated in step S123, to thereby obtain the PB assist trigger threshold value MASTTH.

In step S128, it is determined whether the present value THEM of the degree TH of throttle opening is equal to or above the PB assist trigger threshold value MASTTH calculated in step S126. When the determination is YES, the flow proceeds to step S134. When the determination is NO, the flow proceeds to step S131.

In step S127, the upper PB assist trigger threshold value MASTTHH looked up in step S124 is added to the correction value DPBASTTH calculated in step S123, to thereby obtain the PB assist trigger threshold value MASTTH, and the flow proceeds to step S128.

In step S131, a predetermined delta value #DCRSTHV of the degree TH of throttle opening is subtracted from the PB assist trigger threshold value MASTTH, to thereby obtain a final PB assist trigger lower threshold value MASTTHFL.

In the next step S132, the threshold value is interpolated between MASTTHFL and MASTTH, based on the present value THEM of the degree TH of throttle opening, to obtain a cruise generation subtraction coefficient table value KPBRGTH, and in step S133 this KPBRGTH is set as the cruise generation subtraction coefficient KTRGRGN.

In step S122, the motor assist determination flag F_MAST is set to 0, and the flow returns.

TH Assist Trigger Correction

Figure 9:
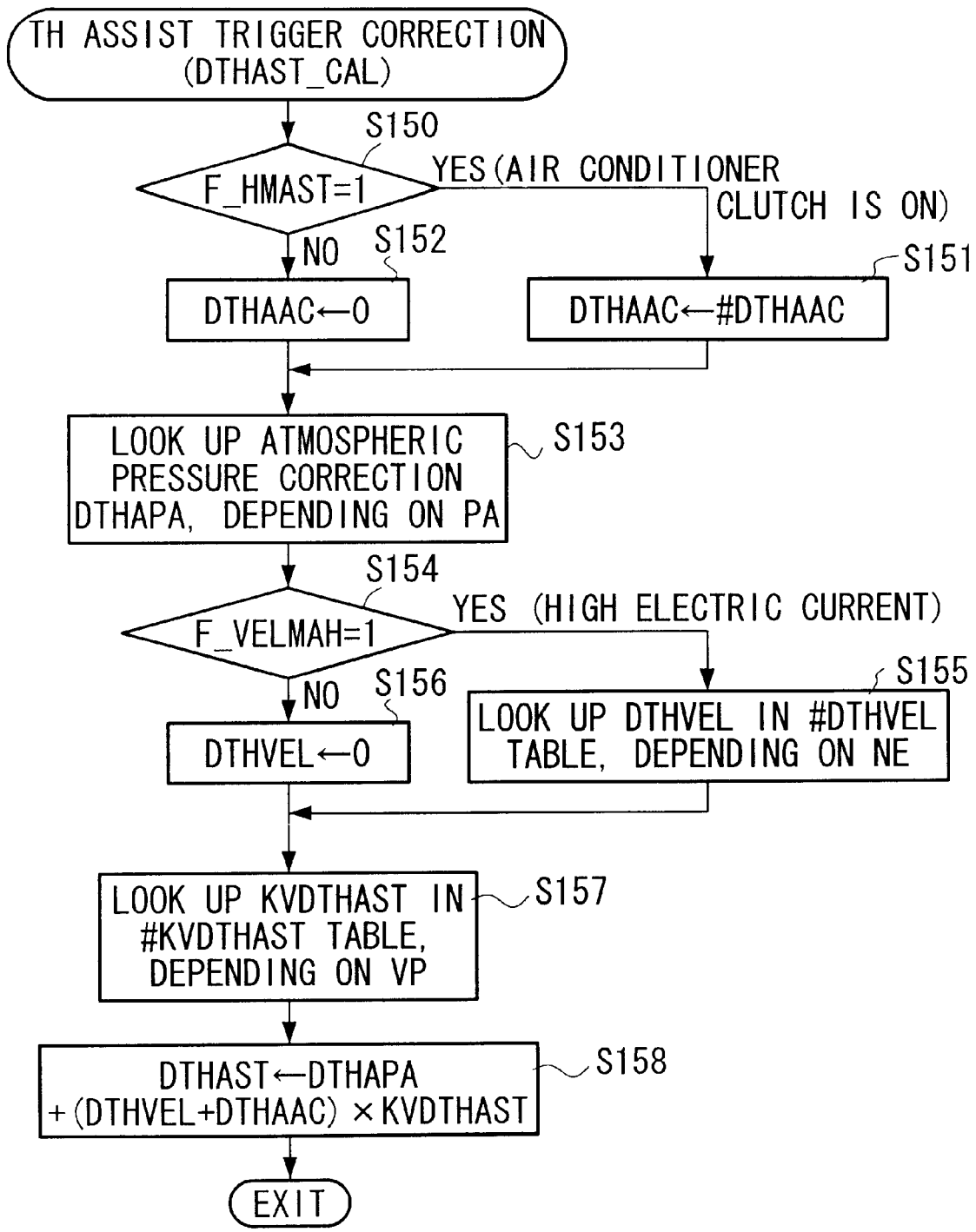
FIG. 9 is a flowchart showing the calculation for correcting the TH assist trigger in the present invention.

The process for calculating the correction for the throttle assist trigger in step S103 will be explained with reference to FIG. 9. FIG. 9 is a flowchart showing the process for calculating the throttle assist trigger correction.

In step S150 in FIG. 9, it is determined whether an air-conditioner clutch ON flag F_HMAST is 1 or not. When this determination is YES, that is, when the air conditioner clutch has been turned on, an air-conditioner correction value DTHAAC is set to a predetermined value #DTHAAC (e.g., 20 degrees) in step S151, and the flow proceeds to step S153.

When in step S150 the determination is NO, that is, when the air-conditioner clutch has been turned off, the air-conditioner correction value DTHAAC is set to 0, and the flow proceeds to step S153. Thus, the threshold value for the motor assist is increased.

In step S153, an atmospheric pressure correction value DTHAPA, which is decreased as the vehicle travels from a high altitude to a low altitude, is looked up in a table, depending on the atmospheric pressure (PA).

Subsequently, in step S154, it is determined whether the high electric current flag F_VELMAH is 1. The setting of the high electric current flag will be explained below. When the consumption of the 12-volt electric current is increased, the threshold value for the assist trigger is increased so that the frequency of the acceleration mode is decreased, and so that the frequency of the cruise mode is increased, thereby preventing the decrease of the remaining battery charge SOC. When in step S154 a large amount of electric current flows, a high electric current correction value DTHVEL, which is decreased as the engine speed NE is increased, is looked up in a table in step S155, and the flow proceeds to step S157. When in step S154 a large amount of electric current does not flow, the high electric current correction value DTHVEL is set to 0 in step S156, and the flow proceeds to step S157.

In the next step S157, a throttle assist trigger load correction vehicle speed correction coefficient KVDTHAST, which is decreased as the engine speed VP for controlling the engine is increased, is looked up in a table. Thus, as the vehicle speed is decreased, the assist trigger threshold value is increased.

In the next step S158, the throttle assist trigger correction value DTHAST is calculated, based on the air-conditioner correction value DTHAAC calculated in step S151 or S152, the atmospheric pressure correction value DTHAPA calculated in step S153, the high electric current correction value DTHVEL calculated in step S155 or S156, and the throttle assist trigger load correction vehicle speed correction coefficient KVDTHAST calculated in step S157, and the control terminates.

PB Assist Trigger Correction (MT)

Figure 10:
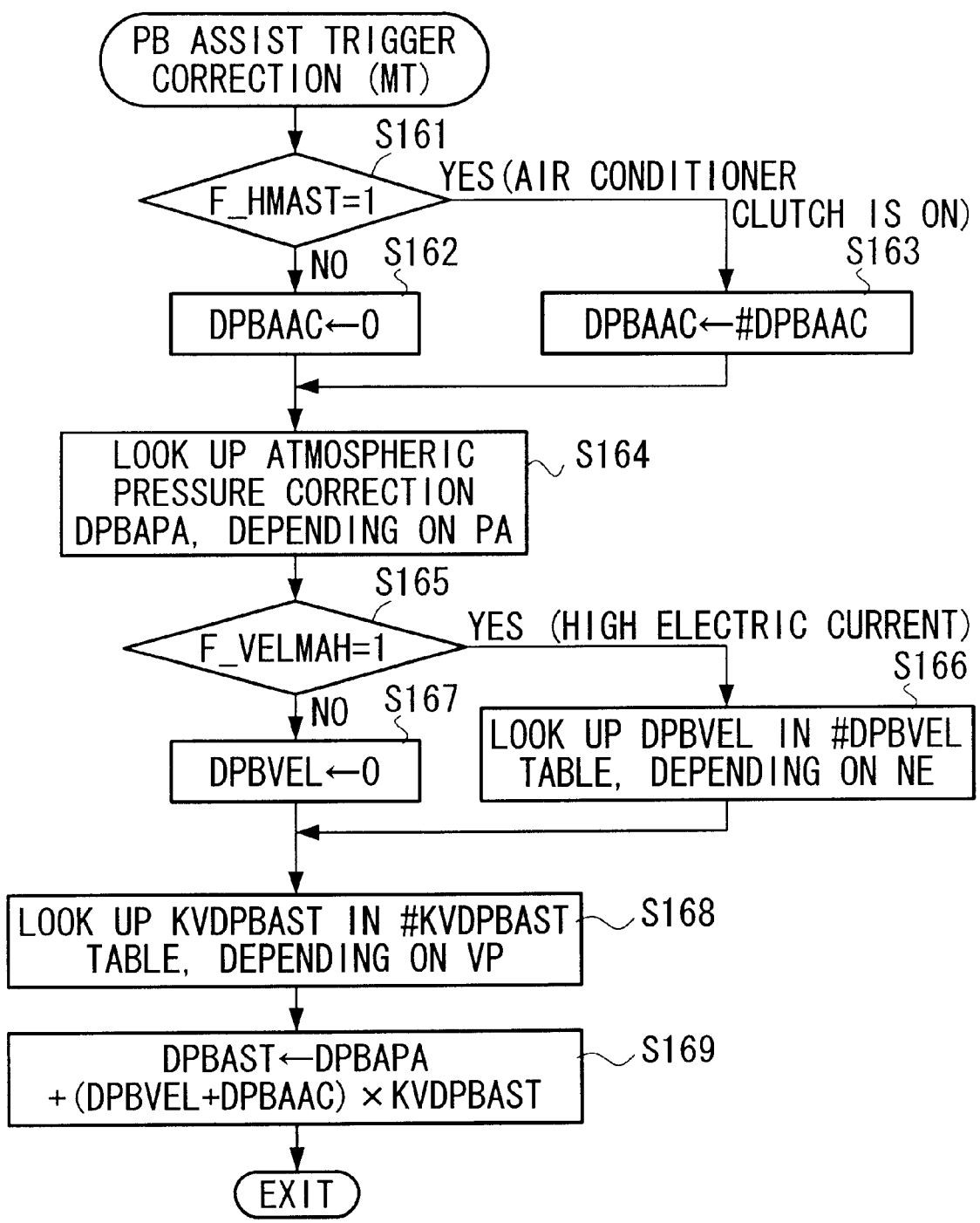
FIG. 10 is a flowchart showing the correction of the PB throttle assist trigger (for the MT vehicle) in the present invention.
Figure 11:
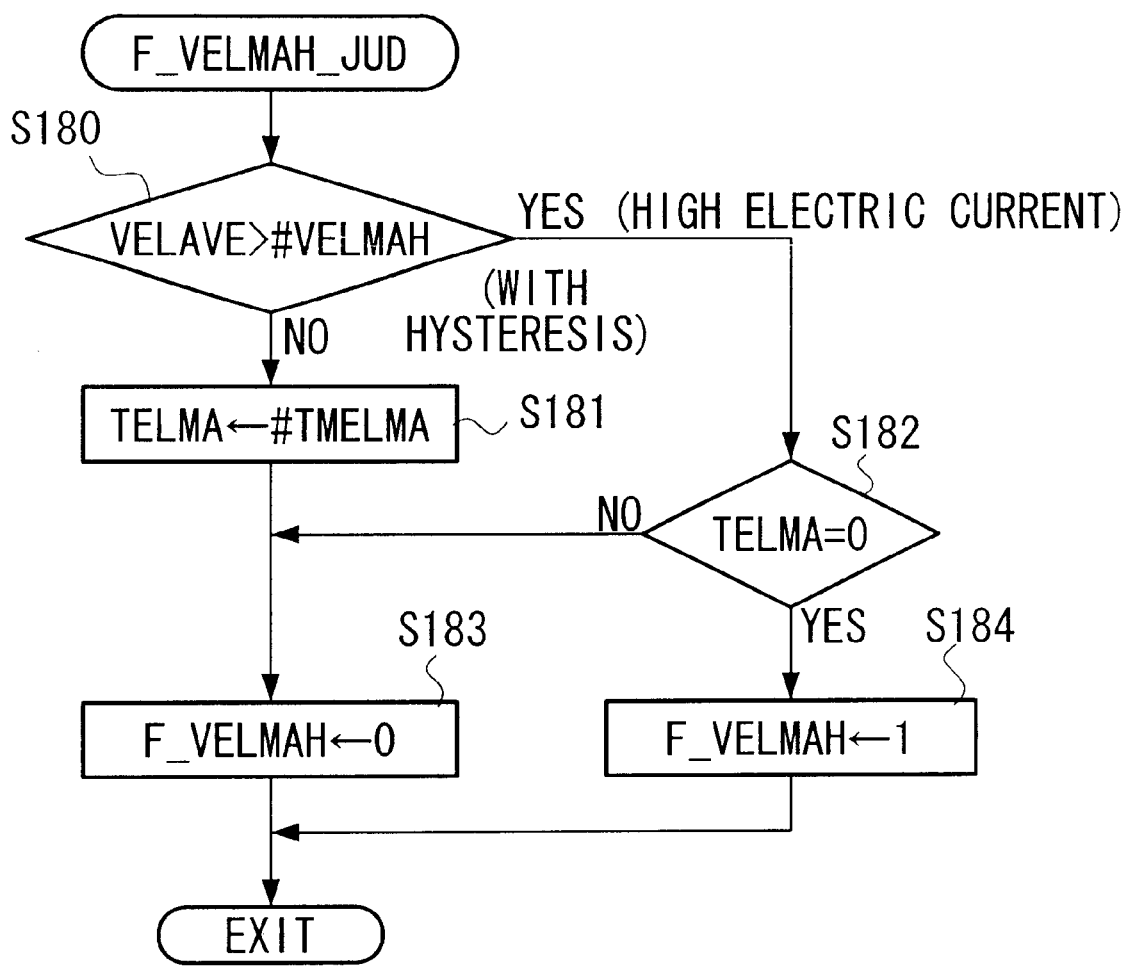
FIG. 11 is a flowchart for setting a high electric current flag in the present invention.

The air intake passage pressure (PB) assist trigger correction in step S111 will be explained with reference to FIGS. 10 and 11. FIG. 10 is a flowchart showing the PB assist trigger correction (for an MT vehicle), and FIG. 11 is a flowchart for setting the high electric current flag.

In step S161 in FIG. 10, it is determined whether an air-conditioner clutch ON flag F_HMAST is 1. When this determination is YES, that is, when the air-conditioner clutch has been turned on, the air-conditioner correction value DPBAAC is set to a predetermined value #DPBAAC in step S163, and the flow proceeds to step S164. When in step S161 the determination is NO, that is, when the air-conditioner clutch has been turned off, the air-conditioner correction value DPBAAC is set to 0 in step S162, and the flow proceeds to step S164. Thus, the threshold value for the motor assistance is increased.

In step S164, an atmospheric pressure correction value DPBAPA, which is decreased as the vehicle travels from a highland to a lowland, is looked up in a table.

In the next step S165, it is determined whether the high electric current flag F_VELMAH is 1. The setting of the high electric current flag will be explained below. As described in step S154, when the consumption of the electric current in the 12-volt system is increased, the threshold value for the assist trigger is increased. When in step S165 a large amount of electric current flows, a high electric current correction value DPBVEL, which is decreased as the engine speed NE is increased, is looked up in a table in step S166, and the flow proceeds to step S168. When in step S165 a large amount of electric current does not flow, the high electric current correction value DPBVEL is set to 0 in step S167, and the flow proceeds to step S168.

In the next step S168, the "PB assist trigger load correction vehicle speed correction coefficient" KVDPBAST (for correcting the PB assist trigger, depending on the vehicle speed) which is decreased as the vehicle speed VP for controlling the engine is increased, is looked up in a table.

In the next step S169, the PB assist trigger correction value DPBAST is calculated, based on the air-conditioner correction value DPBAAC calculated in step S162 or S163, the atmospheric pressure correction value DPBAPA calculated in step S164, the high electric current correction value DPBVEL calculated in step S166 or S167, and the PB assist trigger load correction vehicle speed correction coefficient KVDPBAST calculated in step S168, and the control terminates.

The flowchart for setting the high electric current flag in FIG. 11 will be explained. In step S180, it is determined whether the average consumed electric current VELAVE is above a predetermined value #VELMAH (e.g., 20A). When the determination is YES, that is, when a large amount of electric current flows, it is determined in step S182 whether a delay timer TELMA is 0. When it is 0, the high electric current F_VELMAH is set to 1 in step S184, and the control terminates. When in step S182 the delay timer TELMA is not 0, that is, when a large amount of electric current does not flow, the delay timer TELMA is set to a predetermined value #TMELMA (e.g., 30 seconds) in step S181, and the flow proceeds to step S183. In step S183, the high electric current flag F_VELMAH is set to 0, and the control terminates. The high electric current flag F_VELMAH is determined in the above-described steps S154 and S165, and in step S194 which will be described below.

Thus, this process is limited only when the consumed electric current in the 12-volt system has been increased for a specified time measured by the delay timer TELMA, to exclude a temporal increase of the consumed electric current due to, e.g., the up/down movement of power windows, or the lighting of stop lights.

PB Assist Trigger Correction (CVT)

Figure 12:
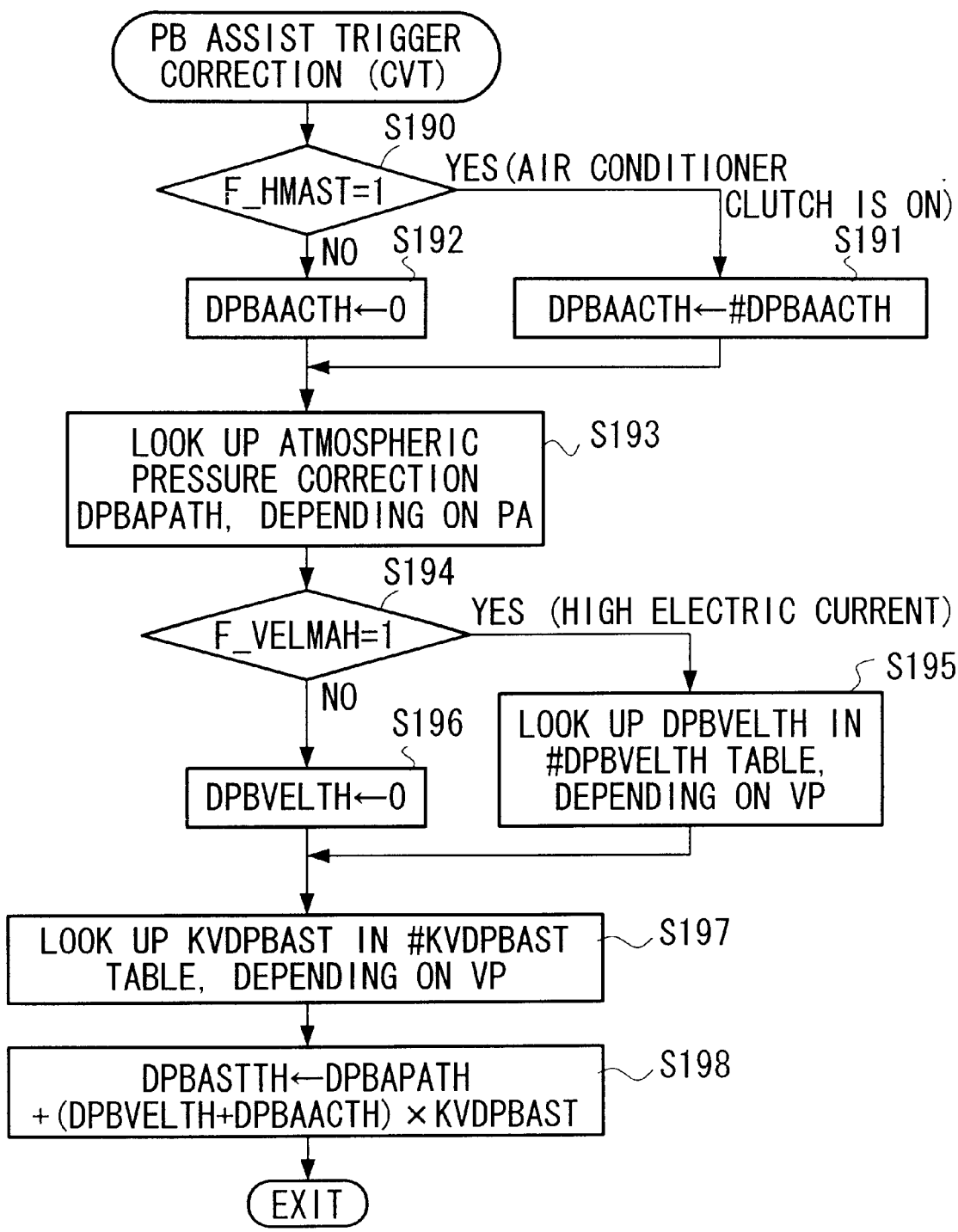
FIG. 12 is a flowchart showing the calculation for correcting the PB assist trigger in the present invention.

The air intake passage pressure (PB) assist trigger correction in step S123 will be explained with reference to the figures. FIG. 12 is a flowchart showing the PB assist trigger correction (for a CVT vehicle).

In step S190 in FIG. 12, it is determined whether the air-conditioner clutch ON flag F_HMAST is 1. When this determination is YES, that is, when the air-conditioner cutch has been turned on, the air-conditioner correction value DPBAACTH is set to a predetermined value #DPBAACTH in step S191, and the flow proceeds to step S193.

When in step S190 the determination is NO, that is, when the air-conditioner clutch has been turned off, the air-conditioner correction value DPBAACTH is set to 0 in step S192, and the flow proceeds to step S193. Thus, the threshold value for the motor assistance is increased.

In step S193, an atmospheric pressure correction value DPBAPATH, which is decreased as the vehicle travels from a high altitude to a low altitude, is looked up in a table.

In the next step S194, it is determined whether the high electric current flag F_VELMAH is 1. As described above, when the consumption of the electric current in the 12-volt system is increased, the threshold value for the assist trigger is increased. When in step S194 a large amount of electric current flows, a high electric current correction value DPBVELTH, which is decreased as the vehicle speed VP for controlling the engine is increased, is looked up in a table in step S195, and the flow proceeds to step S197. When in step S194 a large amount of electric current does not flow, the high electric current correction value DPBVELTH is set to 0 in step S196, and the flow proceeds to step S197.

In the next step S197, the "PB assist trigger load correction vehicle speed correction coefficient" KVDPBAST (for correcting the PB assist trigger, depending on the vehicle speed) is looked up in a table. The KVDPBAST is decreased as the vehicle speed VP for controlling the engine is increased.

In the next step S198, the PB assist trigger correction value DPBASTTH is calculated, based on the air-conditioner correction value DPBAACTH calculated in step S191 or S192, the atmospheric pressure correction value DPBAPATH calculated in step S193, the high electric current correction value DPBVELTH calculated in step S195 or S196, and the PB assist trigger load correction vehicle speed correction coefficient KVDPBAST calculated in step S197, and the control terminates.

Cruise Mode

Figure 13:
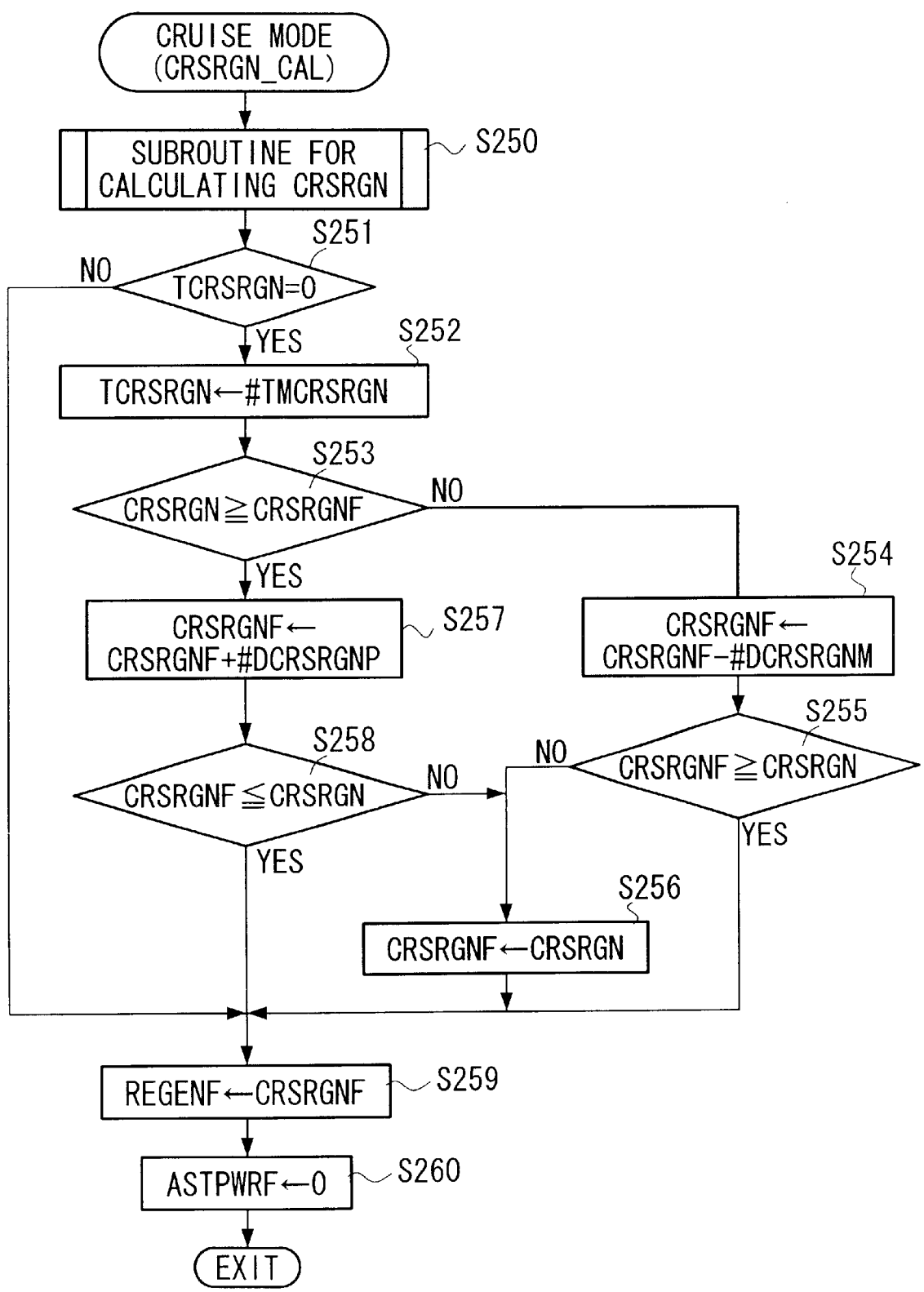
FIG. 13 is a flowchart for the cruise mode in the present invention.
Figure 14:
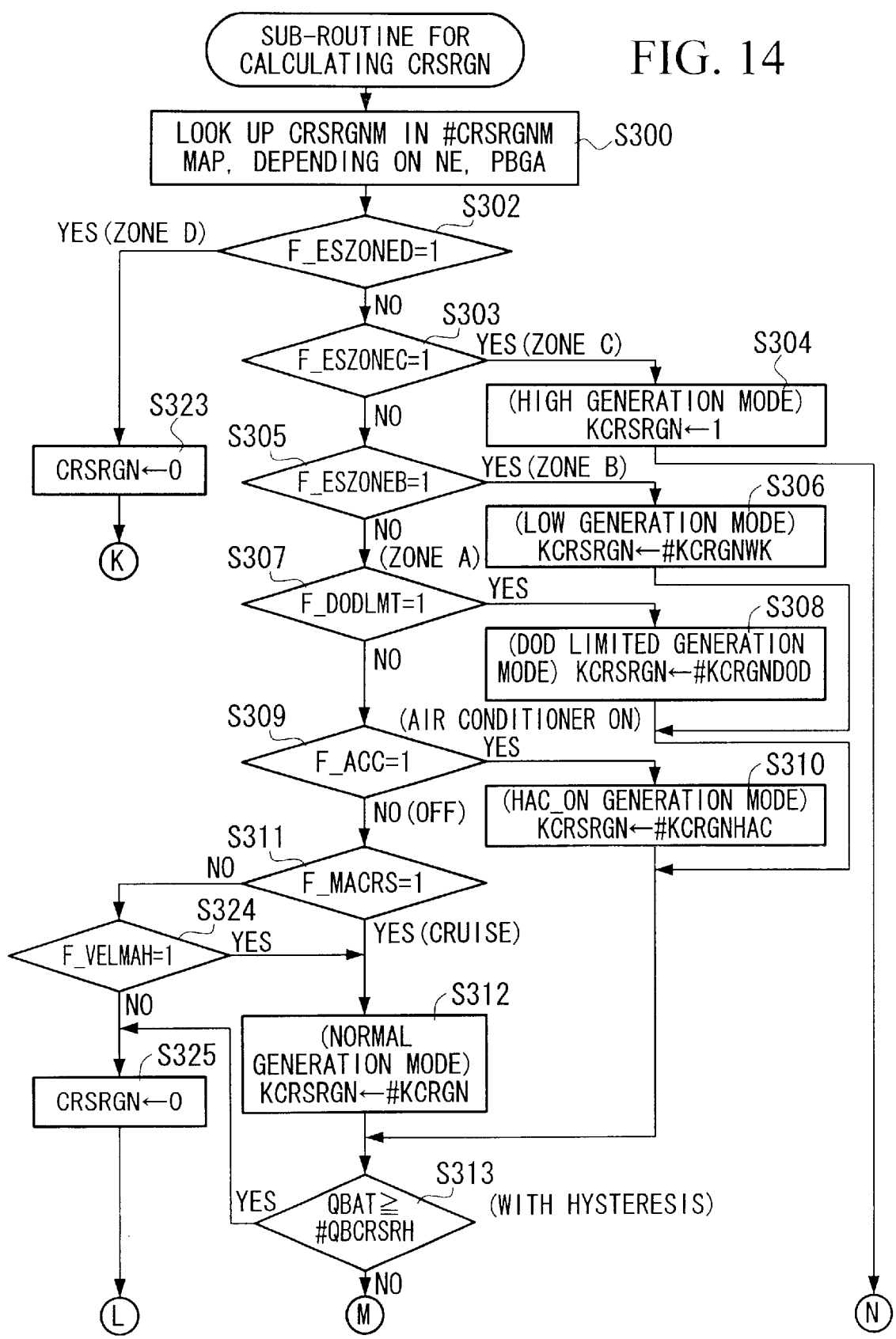
FIG. 14 is a flowchart showing the calculation of the amount of cruise generation in the present invention.
Figure 15:
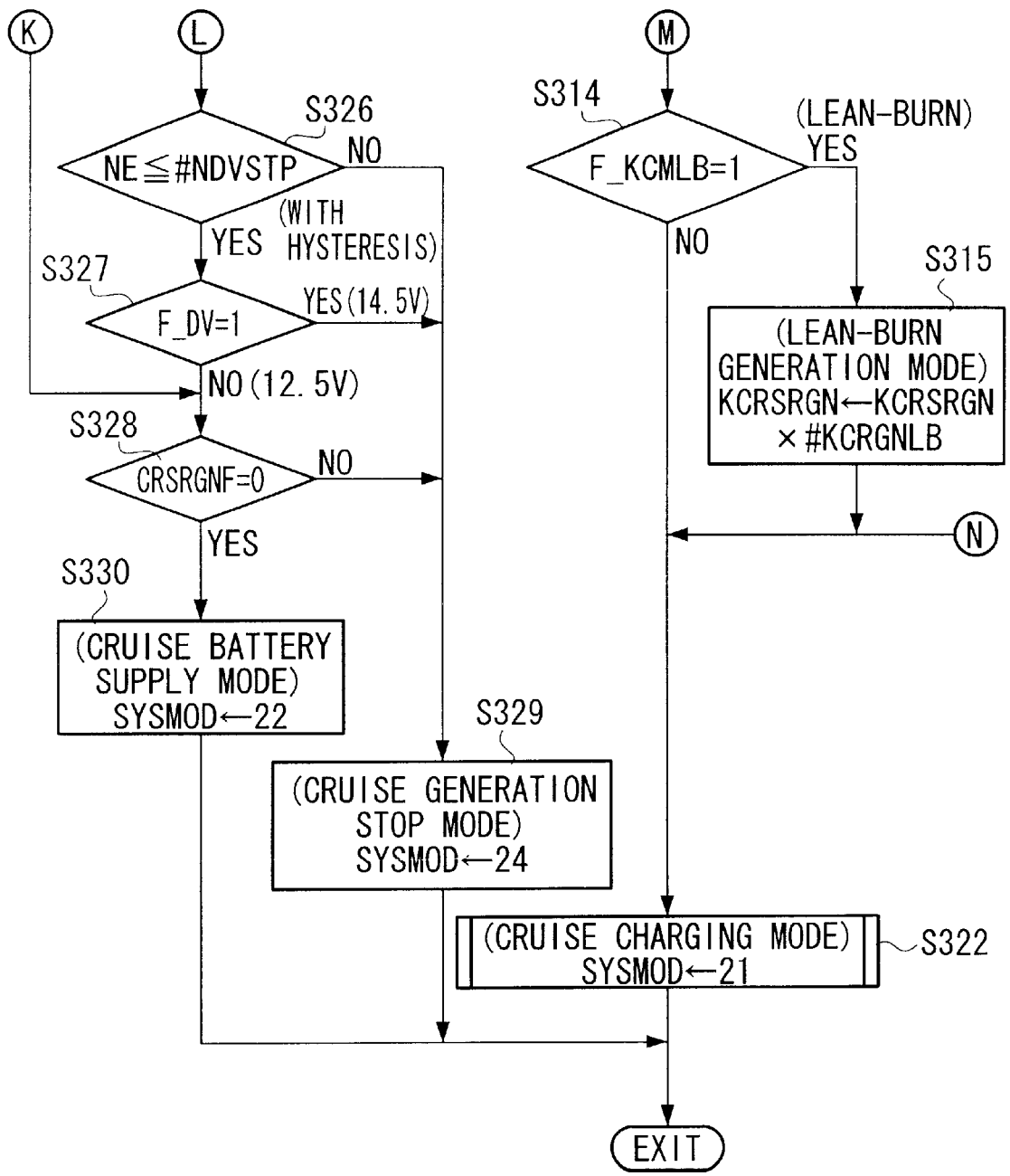
FIG. 15 is a flowchart showing the calculation of the amount of cruise generation.
Figure 16:
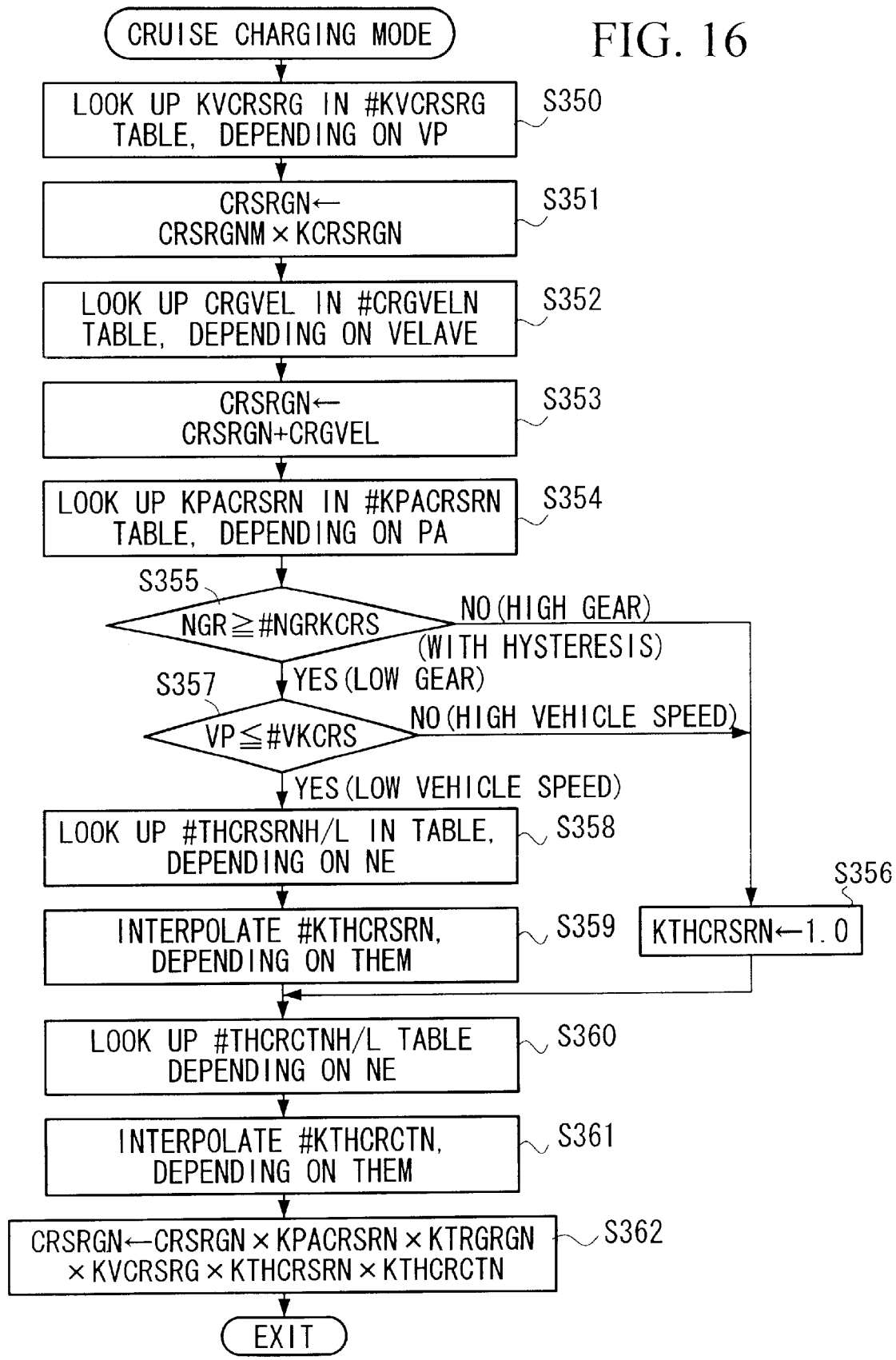
FIG. 16 is a flowchart showing the process in a cruise charging mode in the present invention.
Figure 17:
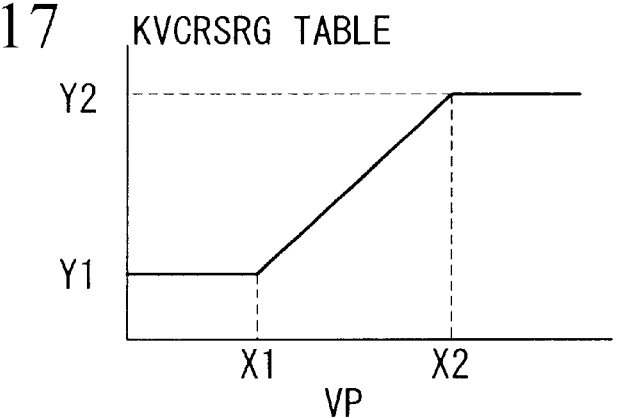
FIG. 17 is a graph for obtaining a cruise generation coefficient #KVCRSRG in the present invention.
Figure 18:
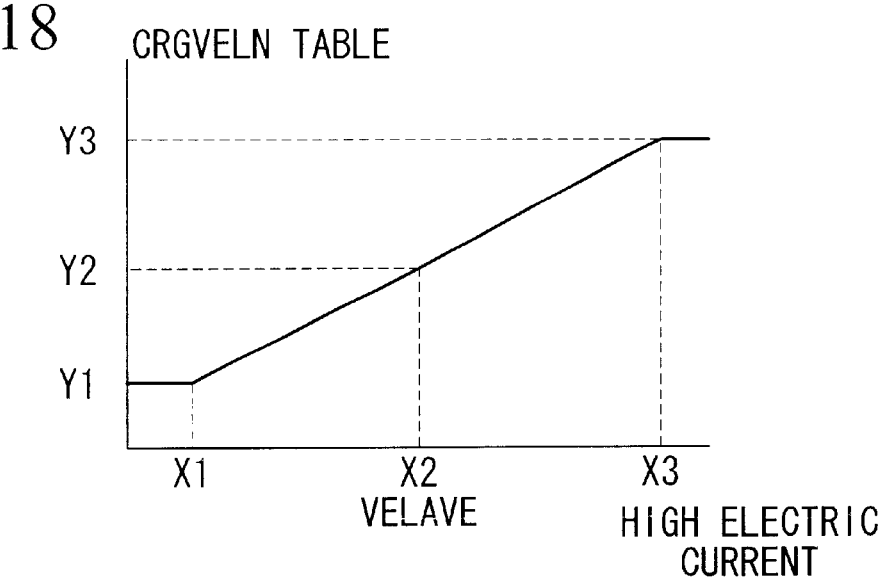
FIG. 18 is a graph for obtaining a cruise generation coefficient #CRGVELN in the present invention.
Figure 19:
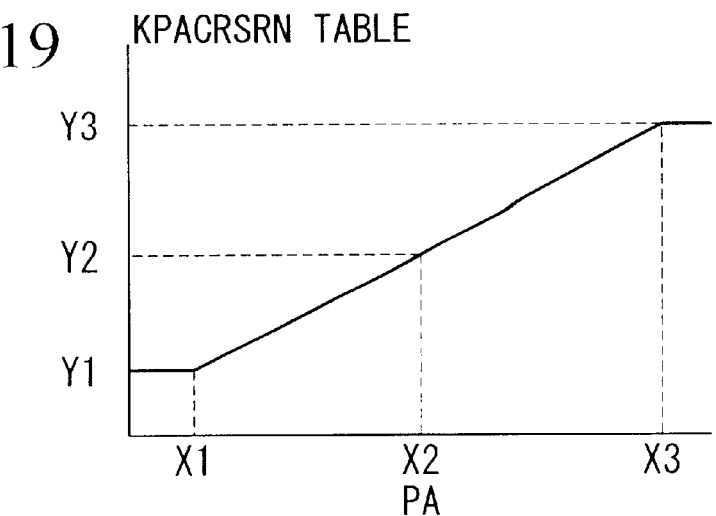
FIG. 19 is a graph for obtaining a cruise generation coefficient #KPACRSRN in the present invention.

Next, the cruise mode will be explained. FIG. 13 is a flowchart showing the cruise mode. FIGS. 14 and 15 are flowcharts for calculating the amount of cruise generation. FIG. 16 is a flowchart showing the process in a cruise charging mode. FIG. 17 is a graph for obtaining a cruise generation amount coefficient #KVCRSRG. FIG. 18 is a graph for obtaining a cruise generation amount coefficient #CRGVELN. FIG. 19 is a graph for obtaining a cruise generation coefficient #KPACRSRN.

As shown in FIG. 13, step S250 performs a process for calculating the cruise generation amount which will be described with reference to FIGS. 14 and 15. The flow proceeds to step S251, and it is then determined whether a gradual addition/subtraction timer TCRSRGN is zero. When this determination is NO, a final generation command value REGENF is set to a final cruise generation amount CRSRGNF in step S259, the final assistance command value ASTPWRF is set to zero in step S260, and the control terminates.

When in step S251 the determination is YES, the gradual additional/subtractive timer TCRSRGN is set to a predetermined value #TMCRSRGN in step S252, and the flow proceeds to step S253. In step S253, it is determined whether the cruise generation amount CRSRGN is equal to or above the final cruise generation amount CRSRGNF.

When in step S253 the determination is YES, the flow proceeds to step S257, and a gradual addition factor #DCRSRGNP is added to the CRSRGNF. Then, in step S258, it is again determined whether the CRSRGN is equal to or above the CRSRGNF. When in step S258 the CRSRGN is equal to or above the CRSRGNF, the flow proceeds to step S259.

When in step S258 the cruise generation amount CRSRGN is below the final cruise generation amount CRSRGNF, the flow proceeds to step S256, the CRSRGNF is set to the CRSRGN, and the flow proceeds to step S259.

When in step S253 the determination is NO, a gradual subtraction factor #DCRSRGNM is subtracted from the CRSRGNF, and it is determined in step S255 whether the CRSRGNF is equal to or above the CRSRGN. When in step S255 the CRSRGN is above the CRSRGNF, the flow proceeds to step S256. When in step S255 the CRSRGNF is equal to or above the CRSRGN, the flow proceeds to step S259.

The process following step S251 eliminates rapid variations in the amount of generation, and allows the vehicle to smoothly enter the cruise generation mode.

Next, the flowchart in step S250 of FIG. 13 for calculating the cruise generation amount will be explained with reference to FIGS. 14 and 15.

In step S300, a cruise generation amount CRSRGNM is looked up in a map. The map defines the cruise generation amount, depending on the engine speed NE and the air intake passage pressure PBGA. The map is changed, depending on the MT or the CVT.

Then, the flow proceeds to step S302, and it is determined whether an energy storage zone D determination flag F_ESZONED is 1. When this determination is YES, that is, when the battery remaining charge SOC is in zone D, the flow proceeds to step S323, the cruise generation amount CRSRGN is set to 0, and the flow proceeds to step S328. It is determined in step S328 whether the final cruise generation command value CRSRGNF is 0. When the final cruise generation command value CRSRGNF is not 0, the flow proceeds to step S329, and enters the cruise generation stop mode, and the control terminates.

When in step S328 the final cruise generation command value CRSRGNF is zero, the flow proceeds to step S330, enters the cruise battery supply mode, and the control terminates.

When in step S302 the determination is NO, that is, when the remaining battery charge SOC is outside zone D, the flow proceeds to step S303, and it is then determined whether the energy storage zone C determination flag F_ESZONEC is 1. When this determination is YES, that is, when the remaining battery charge SOC is within zone C, the flow proceeds to step S304, and a correction coefficient KCRSRGN for the cruise generation is set to 1 (for a high generation mode). Then, the flow proceeds to step S322 which will be described below, and the control terminates.

When in step S303 the determination is NO, that is, when the remaining battery charge SOC is outside zone C, the flow proceeds to step S305.

In step S305, it is determined whether the energy storage zone B determination flag F_ESZONEB is 1. When this determination is YES, that is, when the remaining battery charge SOC is within zone B, the flow proceeds to step S306. In step S306, a correction coefficient KCRSRGN for the cruise generation is set to a cruise generation coefficient #KCRGNWK (for a low generation mode), and the flow proceeds to step S313.

When in step S305 the determination is NO, that is, when the remaining battery charge SOC is outside zone B, the flow proceeds to step S307, and it is then determined whether a DOD limitation determination flag F_DODLMT is 1. When in step S307 the determination is YES, the flow proceeds to step S308, the correction coefficient for the cruise generation amount KCRSRGN is set to the cruise generation amount coefficient #KCRGNDOD (for a DOD limited generation mode), and the flow proceeds to step S313.

When in step S307 the determination is NO, the flow proceeds to step S309, and it is then determined whether an air-conditioner ON flag F_ACC is 1. When the determination is YES, that is, when the air conditioner has been turned on, the flow proceeds to step S310, the correction coefficient for the cruise generation amount KCRSRGN is set to the cruise generation amount coefficient #KCRGNHAC (for a HAC_ON generation mode), and the flow proceeds to step S313.

When in step S309 the determination is NO, that is, when the air conditioner has been turned off, the flow proceeds to step S311, and it is then determined whether a cruise mode determination flag F_MACRS is 1. When in step S311 the determination is NO, that is, when not in the cruise mode, the flow proceeds to step S324, and it is determined whether a high electric current flag F_VELMAH is 1. When in step S324 a high electric current flows, the flow proceeds to step S312 in a manner similar to the case when in the cruise mode, and the cruise generation amount CRSRGN is set to the cruise generation amount coefficient #KCRGN (for a normal generation mode), and the flow proceeds to step S313.

Thus, when the high electric current flag F_VELMAH is 1, the mode is not changed to a cruise battery mode in step S330, or a cruise generation stop mode in step S329, thereby preventing the decrease of the remaining battery charge SOC.

When in step S327 a high electric current is not flowing, the flow proceeds to step S325, the cruise generation amount CRSRGN is set to 0, and the flow proceeds to step S326. In step S326, it is determined whether the engine speed NE is equal to or below a cruise battery supply mode execution upper limit engine speed #NDVSTP. When this determination is YES, that is, when NE≦#NDVSTP, the flow proceeds to step S327.

In step S324, it is determined whether a downverter flag F_DV is 1. When the determination is YES, that is, when the load in the 12-volt system is high, the mode is changed to the cruise generation stop mode in step S329. When in step S327 the determination is NO, that is, when the load in the 12-volt system is low, the flow proceeds to step S328.

When in step S326 the determination is NO, that is, when the engine speed NE >the cruise battery supply mode execution upper limit engine speed #NDVSTP, the flow proceeds to step S329. The #NDVSTP has hysteresis.

In step S313, it is determined whether the remaining battery charge QBAT (which is similar to the remaining battery charge SOC provided at the upper limit of zone A) is equal to or above a normal generation mode execution upper limit remaining charge #QBCRSRH. The #QBCRSRH has hysteresis.

When in step S313 the determination is YES, that is, when QBAT≧#QBCRSRH, the flow proceeds to step S325.

When the remaining battery charge QBAT<the normal generation mode execution upper limit remaining charge #QBCRSRH, it is determined in step S314 whether a lean-burn determination flag F_KCMLB is 1. When this determination is YES, that is, when in the lean-burn state, the correction coefficient KCRSRGN for the cruise generation amount is multiplied by the cruise generation amount coefficient #KCRGNLB (for the lean-burn generation mode) in step S315, the calculated value is set as the correction coefficient KCRSRGN for the cruise generation amount, the flow proceeds to step S322, and then the control terminates.

When in step S314 the determination is NO, that is, when not in the lean-burn mode, the flow proceeds to step S322, and the control terminates.

Cruise Charging Mode

Figure 20:
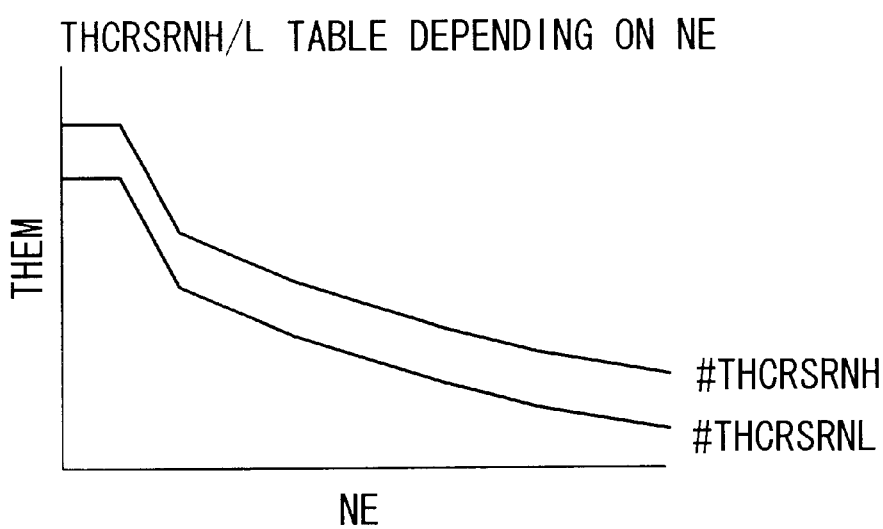
FIG. 20 is a graph for obtaining the degree of throttle opening #THCRSRNH/L for looking up the cruise charging amount correction coefficient, depending on the engine speed NE in the present invention.
Figure 21:
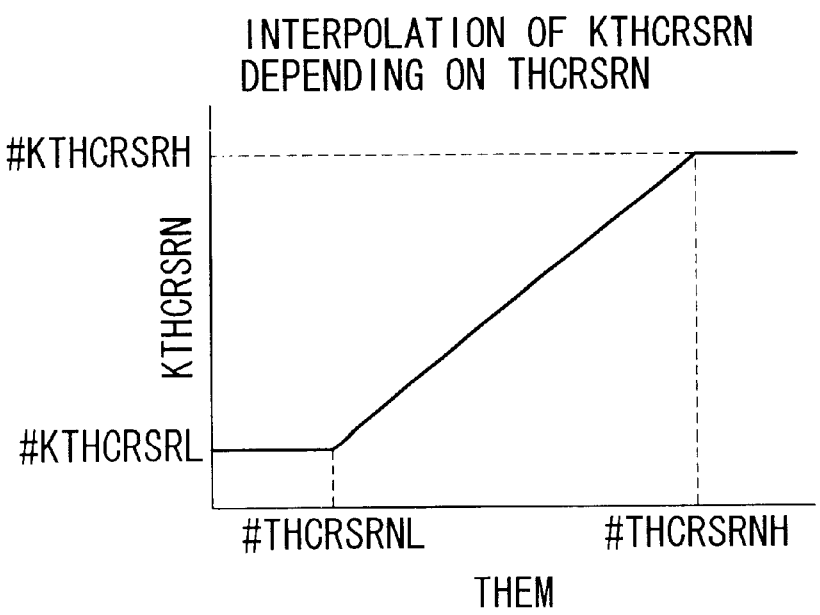
FIG. 21 is a graph for obtaining a cruise charging TH correction coefficient #KTHCRSRN in the present invention.
Figure 22:
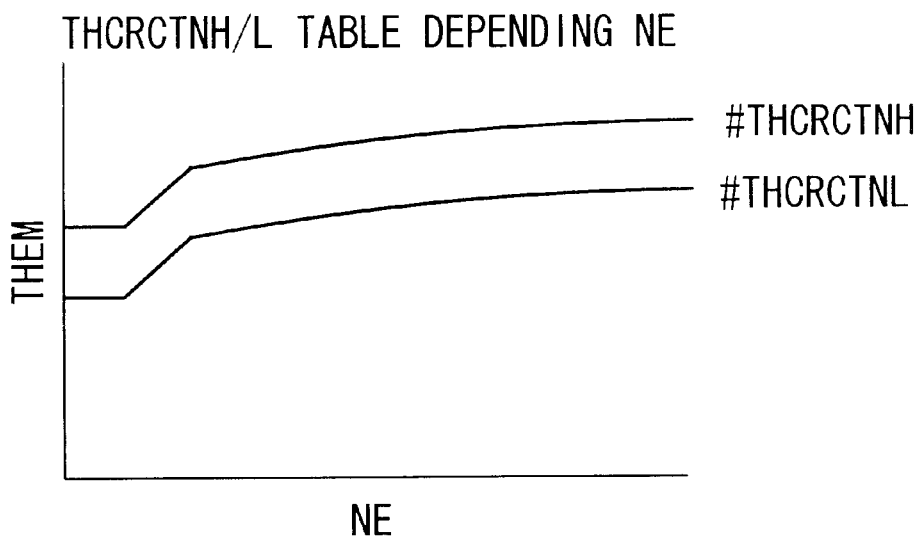
FIG. 22 is a graph for obtaining the degree of throttle opening #THCRCTNH/L for looking up the cruise charging execution upper limit TH correction coefficient in the present invention.
Figure 23:
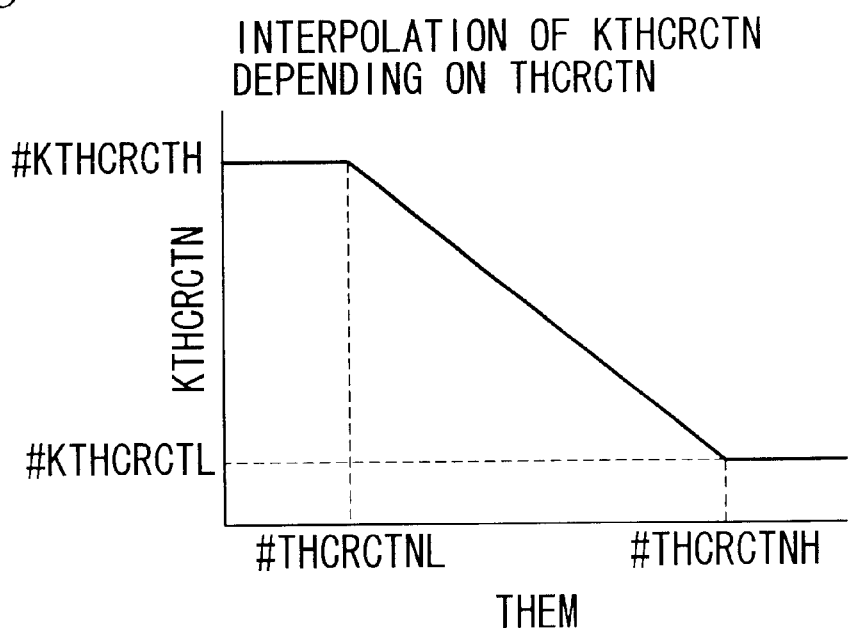
FIG. 23 is a graph for obtaining a cruise charging execution upper limit TH correction coefficient #KTHCRCTN.

The flowchart in the cruise charging mode in step S322 of FIG. 15 will be explained with reference to FIGS. 16 to 23. FIG. 16 is a flowchart showing the cruise charging mode, specifically, a flowchart showing the process for calculating a cruise charging amount correction coefficient. FIG. 17 is a graph for obtaining a cruise generation amount coefficient #KVCRSRG. FIG. 18 is a graph for obtaining a cruise generation amount coefficient #CRGVELN. FIG. 19 is a graph for obtaining a cruise generation amount coefficient #KPACRSRN. FIG. 20 is a graph for obtaining the degree of throttle opening #THCRSRNHIL for looking up the cruise charging amount correction coefficient, depending on the engine speed NE. FIG. 21 is a graph for obtaining a cruise charging TH correction coefficient #KTHCRSRN. FIG. 22 is a graph for obtaining the degree of throttle opening #THCRCTNH/L for looking up cruise charging execution upper limit TH correction coefficient. FIG. 23 is a graph for obtaining a cruise charging execution upper limit TH correction coefficient #KTHCRCTN.

In step S350 in FIG. 16, a cruise generation amount subtractive coefficient KVCRSRG is looked up in a #KVCRSRG table in FIG. 17, depending on the vehicle speed VP for controlling the engine.

In step S351, the map value CRSRGNM value of the amount of cruise generation is multiplied by the correction coefficient KCRSRGN for correcting the amount of cruise generation, and the calculated value is set as the cruise charging amount CRSRGN.

In step S352, a cruise generation amount coefficient #CRGVELN shown in FIG. 18 is looked up in a table, depending on the average consumed current VELAVE, to thereby obtain a cruise generation amount correction additional factor CRGVEL, and the flow proceeds to step S353.

In step S353, the cruise generation amount CRSRGN is added to the cruise generation correction additional factor CRGVEL, the calculated value is set as a new cruise generation amount CRSRGN, and the flow proceeds to step S354. That is, by increasing the cruise generation amount, depending on the consumed electric current in the 12-volt system, the remaining battery charge SOC of the battery 22 is increased when the vehicle is cruising, thereby preventing the decrease of the remaining battery charge SOC caused by the supply to the 12-volt system.

In step S354, a correction coefficient #KPACRSRN, shown in FIG. 18, is looked up in a table, depending on the atmospheric pressure PA to obtain the cruise generation PA correction coefficient KPACRSRN, and the flow proceeds to step S355.

In step S355, it is determined whether the gear position NGR is equal to or above a predetermined gear position threshold value #NGRKCRS, e.g., equal to or above the second gear. When this determination is NO, that is, when the gear is high, the flow proceeds to step S356, a cruise charging TH correction coefficient KTHCRSRN is set to 1.0, and the process following step S360 is performed.

When in step S355 the determination is YES, that is, when the gear is low, the flow proceeds to step S357, and it is determined whether the vehicle speed VP for controlling the engine is equal to or below a predetermined vehicle speed threshold value #VKCRS. The #VKCRS has hysteresis.

When this determination is NO, that is, when at a high speed, the flow proceeds to step S356.

When in step S357 the determination is YES, that is, when at a low vehicle speed, the flow proceeds to step S358.

In step S358, the degrees of throttle opening #THCRSRNH/L, shown in FIG. 20, for looking up the cruise charging amount correction coefficient are looked up in a table, depending on the engine speed NE.

In step S359, as shown in FIG. 21, the upper throttle opening degree #THCRSRNH looked up in step S358 corresponds to a predetermined upper cruise charging TH correction coefficient #KTHCRSRH, e.g., 1.0. The lower throttle opening degree #THCRSRNL looked up in step S358 corresponds to a predetermined lower cruise charging TH correction coefficient #KTHCRSRH, e.g., 0.1. Then, the cruise charging TH correction coefficient #KTHCRSRN between the two points is interpolated, depending on the present value THEM of the degree TH of throttle opening.

In step S360, the degrees of throttle opening #THCRCTNH/L, shown in FIG. 22, for looking up the cruise charging execution upper limit TH correction coefficient are looked up in a table, depending on the engine speed NE.

In step S361, as shown in FIG. 23, the upper throttle opening degree #THCRCTNH looked up in step S360 corresponds to a predetermined lower cruise charging execution upper limit TH correction coefficient #KTHCRCTL, e.g., 0.1. The lower throttle opening degree #THCRCTNL looked up in step S360 corresponds to a predetermined upper cruise charging execution upper limit TH correction coefficient #KTHCRCTH, e.g., 1.0. Then, the cruise charging execution upper limit TH correction coefficient #KTHCRCTN between the two points is interpolated, depending on the present value THEM of the degree TH of throttle opening.

When the present value THEM of the degree of throttle opening is above the throttle opening degree #THCRCTNL for looking up the lower cruise charging execution upper limit TH correction coefficient, it is determined that the driver wishes to maintain or improve the driveability of the vehicle, and the cruise generation amount CRSRGN is decreased so that the cruise charging execution upper limit TH correction coefficient KTHCRCTN.

In step S362, the cruise generation amount CRSRGN is multiplied by the cruise generation amount PA correction coefficient KPACRSRN obtained in step S354, the cruise generation amount subtraction coefficient KTRGRGN (shown in FIG. 5, and set in step S121, S133, S134, or S137), the cruise generation amount subtraction coefficient KVCRSRG obtained in step S350, the cruise charging TH correction coefficient KTHCRSRN calculated in step S359, and the cruise charging execution upper limit TH correction coefficient KTHCRCTN calculated in step S361, to thereby obtain a new cruise generation amount CRSRGN, and the control terminates.

According to the control apparatus 1 for the hybrid vehicle of the present invention, the cruise charging execution upper limit TH correction coefficient KTHCRCTN decreases the cruise generation amount CRSRGN, depending on the present value THEM of the throttle opening degree TH, thereby providing the driving conditions of the vehicle which are responsive to the driver's intention.

That is, when the present value THEM of the degree TH of throttle opening TH is above the throttle opening degree #THCRCTNL for looking up the lower cruise charging execution upper limit TH correction coefficient, the cruise generation amount CRSRGN is decreased so that the motor M can assist the output from the engine E if necessary.

In this case, when the throttle opening degree is comparatively great, e.g., when the vehicle is cruising on an uphill road, the cruise generation amount CRSRGN is decreased so that the motor M appropriately assists the output from the engine E, thereby providing the conditions of the vehicle which are responsive to the driver's intention. Thus, the driver need not frequently depress the accelerator pedal, thereby reducing the fuel consumption.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A control apparatus for a hybrid vehicle with a combustion engine for outputting a driving force, an electric motor for generating a force for assisting the output from the engine, depending on driving conditions, a power storage unit for storing electric energy generated by the motor acting as a generator using the output from the engine and electric energy regenerated by the motor when the vehicle decelerates, the control apparatus comprising:

an output assistance determining device for determining whether to assist the output from the engine by the motor;

a generation controller for setting the amount of generation by the motor and performing the generation by the motor when the output assistance determining device determines that the motor is not to assist the output from the engine; and a generation limiter for limiting the amount of generation set by the generation controller depending on the degree of throttle opening.

2. A control apparatus for a hybrid vehicle according to claim 1, further comprising a generation amount corrector for correcting the amount of generation set by the generation controller, depending on the driving condition of the vehicle, wherein the generation limiter limits the corrected value of the amount of generation.

3. A control apparatus for a hybrid vehicle according to claim 1, further comprising a remaining battery charge measuring device for measuring remaining battery charge, wherein when the remaining battery charge is below a predetermined value, the generation limiter does not limit the amount of generation.

4. A control apparatus for a hybrid vehicle with a combustion engine for outputting a driving force, an electric motor for generating a force for assisting the output from the engine. depending on driving conditions, a power storage unit for storing electric energy generated by the motor acting as a generator using the output from the engine and electric energy regenerated by the motor when the vehicle decelerates, the control apparatus comprising:

a mode determining device for determining at least one to an acceleration mode, a cruise mode, a deceleration mode, depending on the driving condition of the vehicle;

a generation controller for directing the motor to generate electric energy without the assistance of the output from the engine when the mode determining device determines that the vehicle is in the cruise mode; and a generation limiter for limiting the amount of generation, depending on the driving condition of the vehicle, wherein the motor generates the electric energy, based on the amount of generation limited by the generation limiter.

5. A control apparatus for a hybrid vehicle according to claim 4, further comprising a generation amount corrector for correcting the amount of generation set by the generation controller, depending on the driving conditions of the vehicle, wherein the generation limiter limits the corrected value of the amount of generation.

6. A control apparatus for a hybrid vehicle according to claim 5, wherein the generation limiter limits the generation, depending on the degree of throttle opening.

7. A control apparatus for a hybrid vehicle according to claim 1, further comprising a remaining battery charge measuring device for measuring remaining battery charge, wherein when the remaining battery charge is below a predetermined value, the generation limiter does not limit the amount of generation.

* * * * *